US010914310B2

(12) United States Patent
Park et al.

(10) Patent No.: US 10,914,310 B2
(45) Date of Patent: Feb. 9, 2021

(54) BLOWING DEVICE

(71) Applicant: LG ELECTRONICS INC., Seoul (KR)

(72) Inventors: Heechul Park, Seoul (KR); Jaehyuk Jung, Seoul (KR); Kyuhwan Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 295 days.

(21) Appl. No.: 16/082,011

(22) PCT Filed: Feb. 28, 2017

(86) PCT No.: PCT/KR2017/002233
§ 371 (c)(1),
(2) Date: Sep. 4, 2018

(87) PCT Pub. No.: WO2017/150902
PCT Pub. Date: Sep. 8, 2017

(65) Prior Publication Data

US 2020/0291950 A1 Sep. 17, 2020

(30) Foreign Application Priority Data

Mar. 2, 2016 (KR) ........................ 10-2016-0025158

(51) Int. Cl.
*F04D 29/46* (2006.01)
*F04D 25/10* (2006.01)
(Continued)

(52) U.S. Cl.
CPC .......... *F04D 25/10* (2013.01); *F04D 25/166* (2013.01); *F04D 29/424* (2013.01);
(Continued)

(58) Field of Classification Search
None
See application file for complete search history.

(56) References Cited

U.S. PATENT DOCUMENTS 5,522,234 A * 6/1996 Yoo ........................ F24D 15/04 62/238.7
5,938,527 A 8/1999 Oshima et al.
(Continued)

FOREIGN PATENT DOCUMENTS

CN 103 362 834 10/2013
CN 104 047 878 9/2014
(Continued)

OTHER PUBLICATIONS

International Search Report (with English Translation) and Written Opinion dated Jul. 6, 2017 issued in Application No. PCT/KR2017/002233.

(Continued)

*Primary Examiner* — Michael Lebentritt
(74) *Attorney, Agent, or Firm* — KED & Associates LLP

(57) ABSTRACT

A blowing device is provided. The blowing device includes a first blowing unit that suctions air from above and discharges the air downward, and a second blowing unit disposed below the first blowing portion so as to suction air from below and to discharge the air upward. The blowing device is advantageous in that no matter what position the user is in, wind may be easily discharged to the user.

20 Claims, 19 Drawing Sheets

(51) Int. Cl.
*F04D 25/16* (2006.01)
*F04D 29/42* (2006.01)

(52) U.S. Cl.
CPC ....... *F04D 29/4246* (2013.01); *F04D 29/462* (2013.01); *F05D 2250/52* (2013.01)

(56) References Cited

U.S. PATENT DOCUMENTS

| | | | | |
|---|---|---|---|---|
| 9,714,773 | B2 * | 7/2017 | Lee | F24F 1/0047 |
| 9,989,269 | B2 * | 6/2018 | Park | F24F 3/1405 |
| 10,675,577 | B2 * | 6/2020 | Jung | B01D 46/2411 |
| 2005/0019155 | A1 | 1/2005 | Lasko | |
| 2006/0008353 | A1 * | 1/2006 | Wang | F04D 25/105 416/244 R |
| 2007/0146991 | A1 * | 6/2007 | Chen | H05K 7/20172 361/695 |
| 2009/0317240 | A1 | 12/2009 | Wei | |
| 2010/0329859 | A1 * | 12/2010 | Chen | F04D 19/007 415/198.1 |
| 2015/0008771 | A1 * | 1/2015 | Lee | H02K 9/06 310/62 |

FOREIGN PATENT DOCUMENTS

| | | |
|---|---|---|
| FR | 1 528 640 | 6/1968 |
| JP | 2001-153388 | 6/2001 |
| JP | 2002-340369 | 11/2002 |
| KR | 10-1998-0044264 | 9/1998 |
| KR | 10-0270787 | 11/2000 |
| KR | 10-2002-0017126 | 3/2002 |
| KR | 10-2008-0087365 | 10/2008 |
| KR | 10-0919317 | 10/2009 |
| KR | 10-2011-0078803 | 7/2011 |
| KR | 10-1280371 | 7/2013 |

OTHER PUBLICATIONS

Korean Office Action dated Sep. 12, 2017 issued in Application No. 10-2016-0025158.
European Search Report dated Oct. 8, 2019.

* cited by examiner

BLOWING DEVICE

CROSS-REFERENCE TO RELATED PATENT APPLICATIONS

This application is a U.S. National Stage Application under 35 U.S.C. § 371 of PCT Application No. PCT/KR2017/002233, filed Feb. 28, 2017, which claims priority to Korean Patent Application No. 10-2016-0025158, filed Mar. 2, 2016, whose entire disclosures are hereby incorporated by reference.

TECHNICAL FIELD

The present invention relates to a blowing device.

BACKGROUND ART

In general, a blowing device is understood as a device for sucking air and blowing air to a position desired by a user. Such a blowing device is mainly disposed in an indoor space such as a home or office, and is mainly used to cool the user by blowing air to the user in hot weather such as in summer.

A conventional blowing device generally includes a support and a blower. The prior art relating to the conventional blowing device is as follows.

PRIOR ART

Patent Document

Korean Patent Laid-Open Publication 10-2008-0087365 (Publication date: Oct. 1, 2008, Title of the invention: Electric fan)

The conventional blowing device disclosed in the above patent document includes a main body having a motor mounted therein, a blade portion coupled to the motor and installed on the main body to be rotated according to operation of the motor, and a support disposed below the main body to support the main body.

In addition, a first safety cover and a second safety cover are coupled at the front side of the main body coupled with the motor and the blade portion is disposed therebetween. The first safety cover and the second safety cover prevent the user from directly contacting the rotating blade portion.

In the conventional blowing device, when the motor in the main body is driven, the blade portion may rotate to blow air toward the user.

Such a blowing device has the same configuration as a widely used blowing device.

However, the conventional blowing device has following problems.

First, air blown by the blade portion is generated only in one direction and the rotation angle of the main body does not exceed 180 degrees. Therefore, the user has to manually move the support and the main body of the blowing device.

Second, since the first safety cover and the second safety cover, between which the blade portion is disposed, are generally formed in a grill shape, fine dust or foreign materials in outside air are accumulated on the blade portion. Therefore, when the user uses the blowing device, the user suffers inconvenience due to dust.

Third, if air is contaminated to include fine materials or foreign materials, the contaminated air is sucked and blown and thus contaminants are directly discharged to the user together with blown air.

Fourth, the blowing device is generally used in hot weather, such as in summer, but cannot be used in cold weather, such as in winter. Therefore, the blowing device must be left or kept separately.

Fifth, when users are located in a plurality of spaces, since the blowing device discharges air to one space, users located in the other spaces, to which air is not blown, (for example, behind the blade portion of the blowing device) cannot cool off.

DISCLOSURE

Technical Problem

In order to solve problems as above, a blowing device according to an embodiment of the present invention is disclosed.

An object of the present invention devised to solve the problem lies in a blowing device capable of rotating by 360 degrees about a center shaft such that air is discharged to a position desired by a user at any time.

Another object of the present invention devised to solve the problem lies in a blowing device having clean appearance without dust accumulated on a fan by reducing the area of the fan for flowing air.

Another object of the present invention devised to solve the problem lies in a blowing device capable of purifying contaminated air and discharging purified air by filtering outside air and discharging the filtered air to the outside.

Another object of the present invention devised to solve the problem lies in a blowing device capable of discharging cool air in summer and discharging warm air in winter.

Another object of the present invention devised to solve the problem lies in a blowing device capable of discharging air to different positions.

Technical Solution

The object of the present invention can be achieved by providing a blowing device including a first blowing unit configured to suck air from above and to discharge air downward and a second blowing unit disposed below the first blowing unit to suck air from below and to discharge air upward, The first blowing unit and the second blowing unit are rotated about a central axis thereof to adjust an air discharging direction.

The first blowing unit and the second blowing unit may be independently rotated, thereby increasing the amount of discharged air and diversifying an air discharging direction.

The first blowing unit and the second blowing unit may have the same central axis and vertically symmetrical to each other.

The first blowing unit and the second blowing unit may be capable of being rotated by 360 degrees about the central axis.

The blowing device may further include a first discharging part provided in the first blowing unit to discharge air and a second discharging part provided in the second blowing unit to discharge air.

The first blowing unit and the second blowing unit may be rotated such that flow directions of air discharged by the first discharging part and air discharged by the second discharging part become the same.

The first blowing unit and the second blowing unit may be rotated such that flow directions of air discharged by the first discharging part and air discharged by the second discharging part become different.

The first blowing unit may include a first suction part disposed at an upper side thereof and having formed therein a first suction opening, through which air is sucked, and a first flow generator disposed below the first suction part to generate flow of the sucked air.

The first blowing unit may further include a first rotation discharging part rotatably connected to the first flow generator to guide air flowing by the first flow generator and to discharge air downward and a first flow changing part disposed below the first rotation discharging part to change flow of the air discharged from the first rotation discharging part to a lateral direction.

The blowing device may further include a first case connected to a lower end of the first suction part to form appearance of the first blowing unit, and the first rotation discharging part may be disposed between the first case and the first flow generator.

The first flow generator may include a first fan configured to generate air flow by rotation, a first fan motor configured to provide drive force for rotating the first fan, and a first fan housing in which the first fan motor and the first fan are received.

The first rotation discharging unit may include a first flow guide part disposed between the first case and the first fan housing to provide a first guide flow passage, through which air flowing by the first fan is guided, and a first discharging part disposed below the first flow guide part and having formed therein a first discharging port for discharging the air guided by the first flow guide part downward, and the first discharging part is rotated.

The first discharging part communicates with the first flow guide part such that the first guide flow passage and the first discharging port are vertically arranged.

One or more first pinion gears provided in the first fan housing, a first drive motor configured to transmit drive force to the first pinion gears, and first rack gears provided in the first discharging part and engaged with the first pinion gears are formed.

When the first pinion gears and the first rack gears are interlocked, the first discharging part may be rotated.

The first rotation discharging part may further include a guide support disposed between the first flow guide part and the first fan housing to support the first flow guide part.

The first flow changing part may have an inclined surface rounded from a center portion thereof to an outside thereof.

The blowing device may further include a filter disposed in the first suction opening to filter the sucked air.

The blowing device may further include a heater provided at a lower portion of the second blowing unit.

According to another aspect, a blowing device includes a first blowing unit configured to suck air from above and to discharge air downward and a second blowing unit disposed below the first blowing unit to suck air from below and to discharge air upward.

The first blowing unit and the second blowing unit may be vertically symmetrical to each other.

The blowing device may further include a first fan provided in the first blowing unit and a second fan provided in the second blowing unit.

A centrifugal fan may be included in the first fan or the second fan.

The blowing device may further include a partitioning device disposed between the first blowing unit and the second blowing unit.

The partitioning device may include a first flow changing part disposed below the first blowing unit and extending from a center portion in an outer radial direction and a second flow changing part disposed above the second blowing unit and extending from a center portion in an outer radial direction.

Advantageous Effects

The blowing device according to the embodiments of the present invention having the configuration has the following effects.

First, by discharging air in a direction of 360 degrees about a central shaft of the blowing device, it is possible to discharge air to a user regardless of the position of the user and to reduce inconvenience of moving the blowing device.

Second, dust is not accumulated on the fan in the blowing device and the appearance of the blowing device is clean.

Third, even when indoor air is contaminated, since the contaminated air is filtered out, purified air can be discharged to a user.

Fourth, it is possible to discharge cool air in summer and to discharge warm air in winter.

Fifth, even when users are located at different positions, since air is simultaneously discharged to the users, the range, in which the air is discharged, of the indoor space is increased.

BEST MODE

Hereinafter, exemplary embodiments of the present invention will be described in detail with reference to the accompanying drawings, which will be readily apparent to those skilled in the art to which the present invention pertains. The present invention may be embodied in many different forms and is not limited to the structures and methods described herein.

It will be understood that, although the terms first, second, A, B, (a), (b), etc. may be used herein to describe various elements of the present invention, these terms are only used to distinguish one element from another element and essential, order, or sequence of corresponding elements are not limited by these terms.

Figure 1:
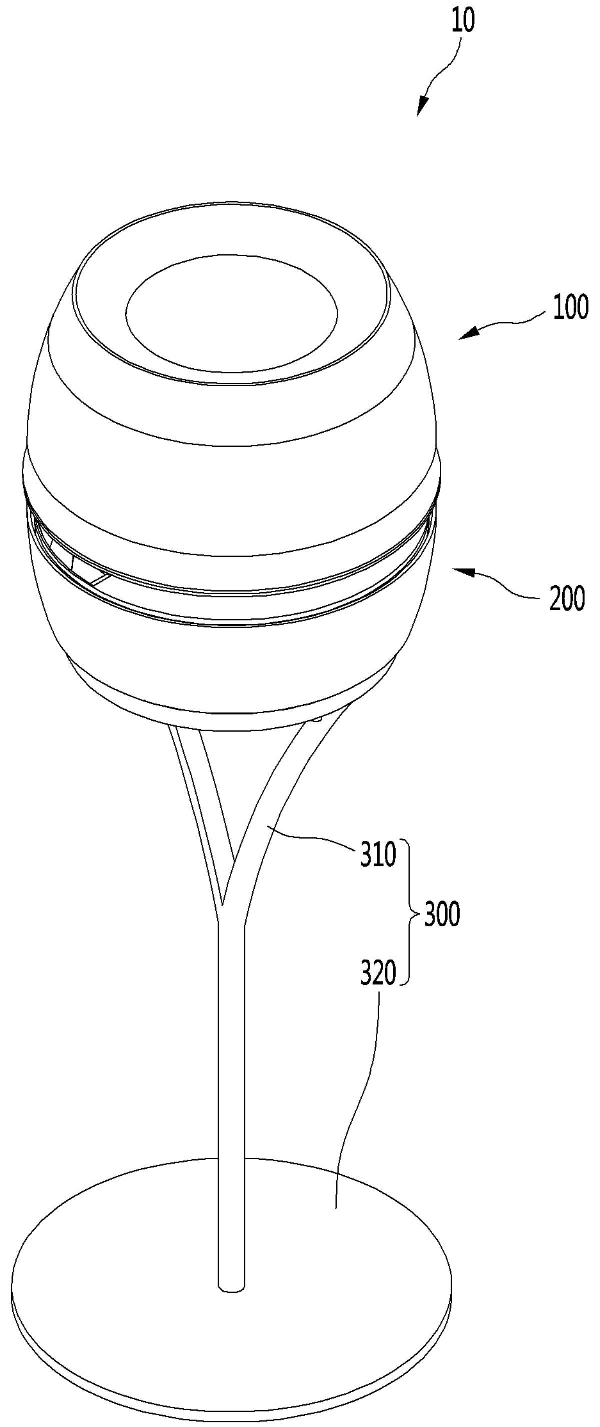
FIG. 1 is a perspective view of a blowing device according to an embodiment of the present invention.
Figure 2:
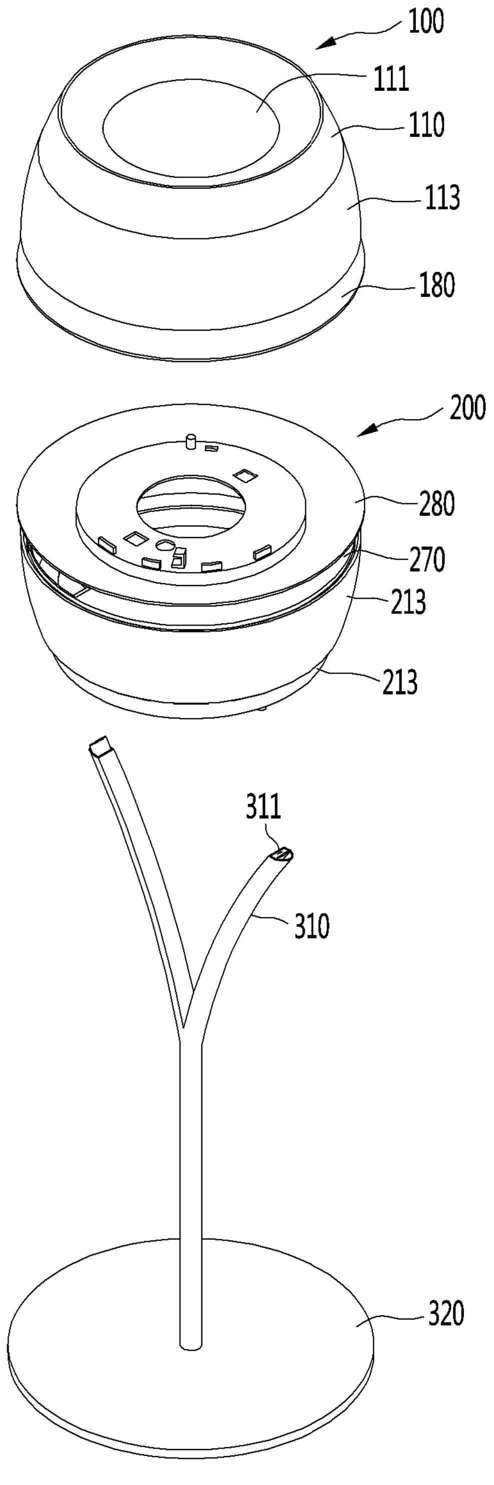
FIG. 2 is an exploded view of a blowing device according to an embodiment of the present invention.

FIG. 1 is a perspective view of a blowing device according to an embodiment of the present invention, and FIG. 2 is an exploded view of a blowing device according to an embodiment of the present invention.

Referring to FIGS. 1 and 2, the blowing device according to the embodiment of the present invention may include main bodies 100 and 200 for generating air flow and a support 300 supporting the main bodies 100 and 200. The main body 10 may include a first blowing unit 100 for generating first air flow and a second blowing unit 200 for generating second air flow.

Specifically, the first blowing unit 100 and the second blowing unit 200 may be arranged or stacked in a vertical direction. In one embodiment, the first blowing unit 100 may be provided above the second blowing unit 200. In this case, the first air flow may form flow of indoor air sucked from the upper side of the main body 10 and discharged to the central portion thereof and the second air flow may form flow of indoor air sucked from the lower side of the main body 10 and discharged to the central portion thereof.

In addition, the first blowing unit 100 and the second blowing unit 200 may have the same vertical central axis. In addition, the first blowing unit 100 and the second blowing unit 200 may be vertically symmetrical with respect to a horizontal center line between the first blowing unit 100 and the second blowing unit 200. That is, the appearance of the first blowing unit 100 and the appearance of the second blowing unit 200 may have the same shape.

The first blowing unit 100 may suck indoor air from the upper side of the main body 10 and discharge the indoor air in the lower lateral direction to generate the first air flow and the second blowing unit 200 may suck indoor air from the lower side of the main body 10 and discharge the indoor air in the upper lateral direction to generate the second air flow. In this case, the discharge direction of the first air flow and the discharge direction of the second air flow may be the same.

For example, if the discharge direction of the first air flow is the front side of the main body 10, the discharge direction of the second air flow may be the front side of the main body 10. In contrast, the discharge direction of the first air flow and the discharge direction of the second air flow may be different from each other. For example, if the discharge direction of the first air flow is the front side of the main body 10, the discharge direction of the second air flow may be the back side of the main body 10.

The support 300 may be disposed below the main body 10 to support the main body 10. Specifically, the support 300 may include a first support 310 connected to the lower side of the main body 10 to support the main body 10 and a second support 320 connected to the lower end of the first support 310 and horizontally provided on the ground, the second support 320 having a plate-shape.

The first support 310 may extend from the main body 10 to the second support 320. Specifically, the first support 310 may be an Y-shaped pipe. In this case, the upper portion of the Y-shaped pipe may be connected to the lower end of the main body 10 and the lower portion of the Y-shaped pipe may be connected to the second support 320.

In addition, a wire reception space 311 in which a plurality of wires is received may be formed in the first support 310. Specifically, the first support 310 may include a pipe having the wire reception space 311 formed therein and the wire connected to the main body 10 may extend to the second support 320 through the wire reception space 311 of the first support 310. The plurality of wires may be connected to the main body 10 and the below-described PCB.

The second support 320 may be connected to the lower end of the first support 310 and may be horizontally seated on the ground to support the main body 10. That is, the second support 320 may be understood as a "base" supporting the blowing device on the ground.

The PCB for controlling operation of the main body 10 may be received in second support 320. In this case, the plurality of wires may be disposed on the wire reception space 311 of the first support 310 in a state in which one end thereof is connected to the main body 10, and the other end thereof may extend to the second support 320 to be connected to the PCB disposed in the second support 320, thereby connecting the main body 10 and the PCB. That is, in the blowing device according to the embodiment of the present invention, the PCB and the wires are received in the support 300, thereby maintaining the small size of the main body 10.

Hereinafter, the configuration of the main body 10 of the blowing device according to the embodiment of the present invention will be described in detail.

Figure 3:
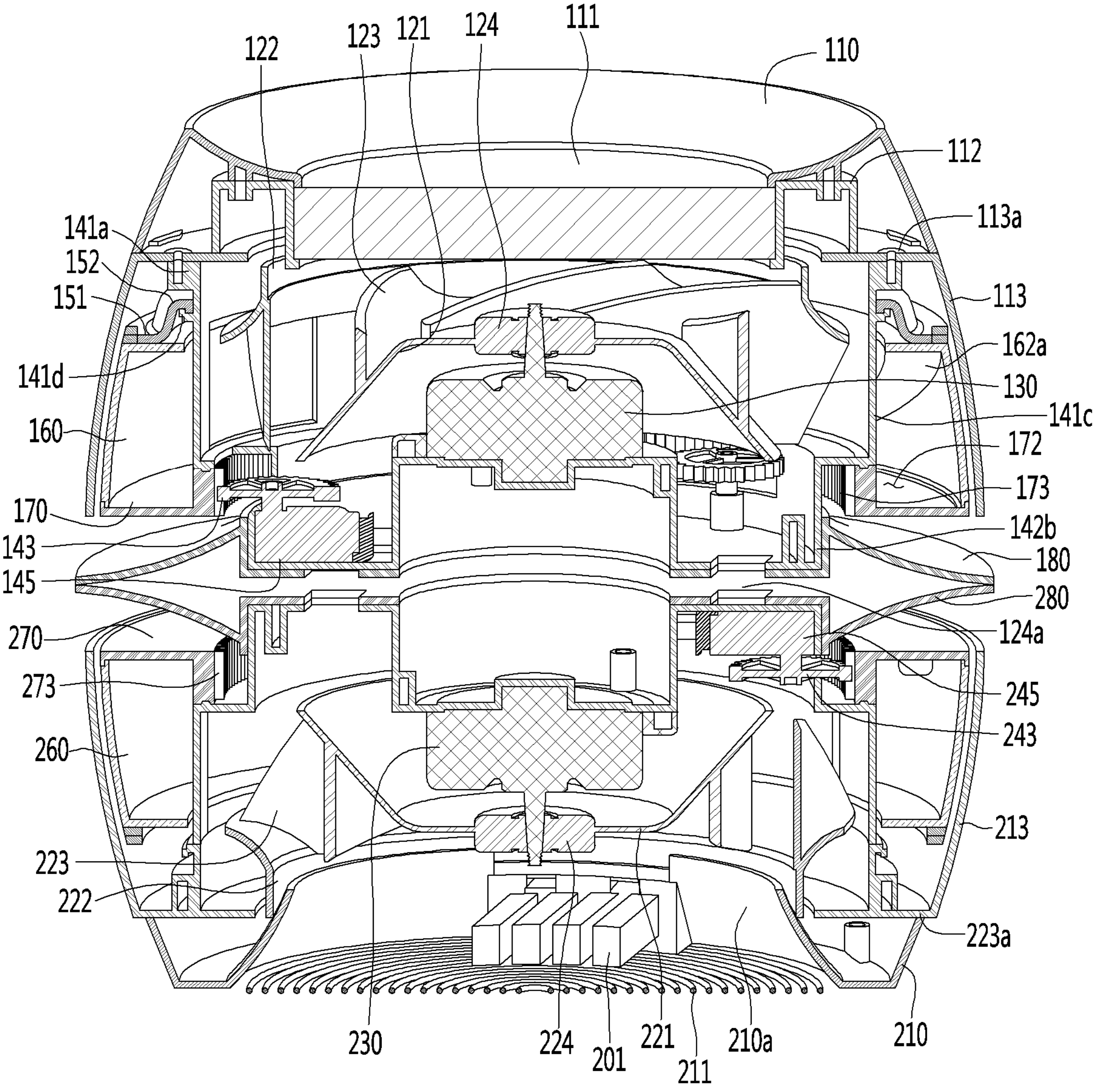
FIG. 3 is a cross-sectional view of a main body of a blowing device according to an embodiment of the present invention.
Figure 4:
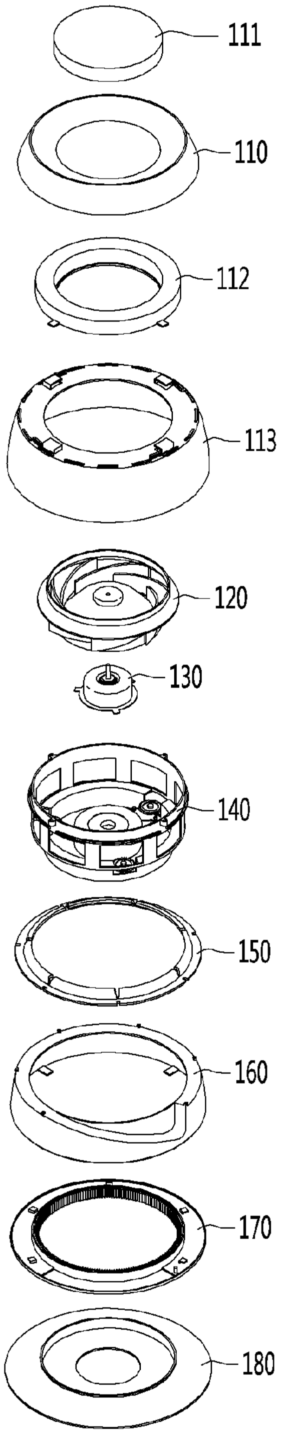
FIG. 4 is an exploded view of a blowing device according to an embodiment of the present invention.
Figure 5:
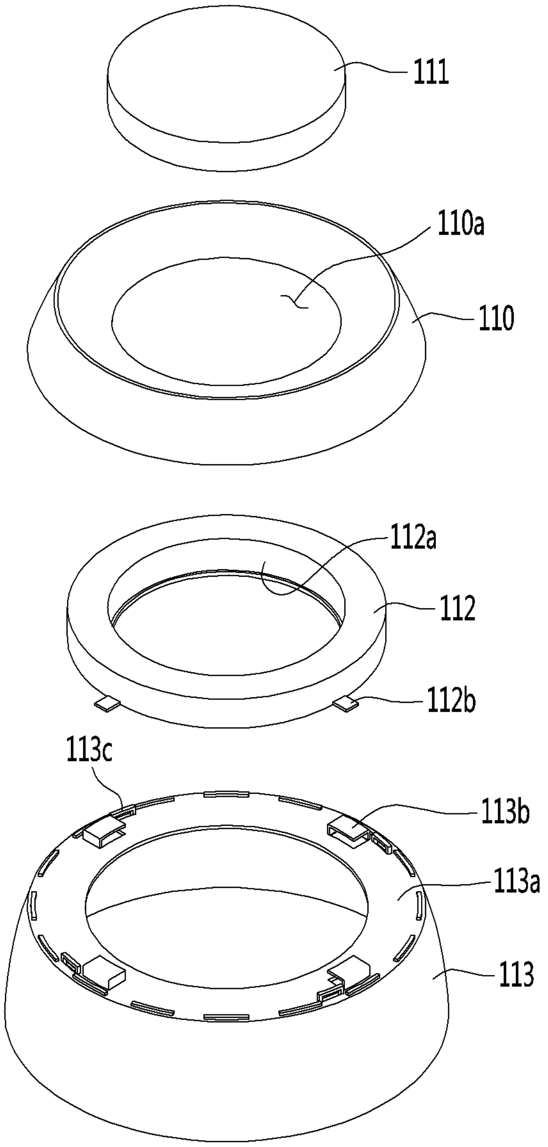
FIG. 5 is an exploded view of a first suction part and a first case according to an embodiment of the present invention.
Figure 6:
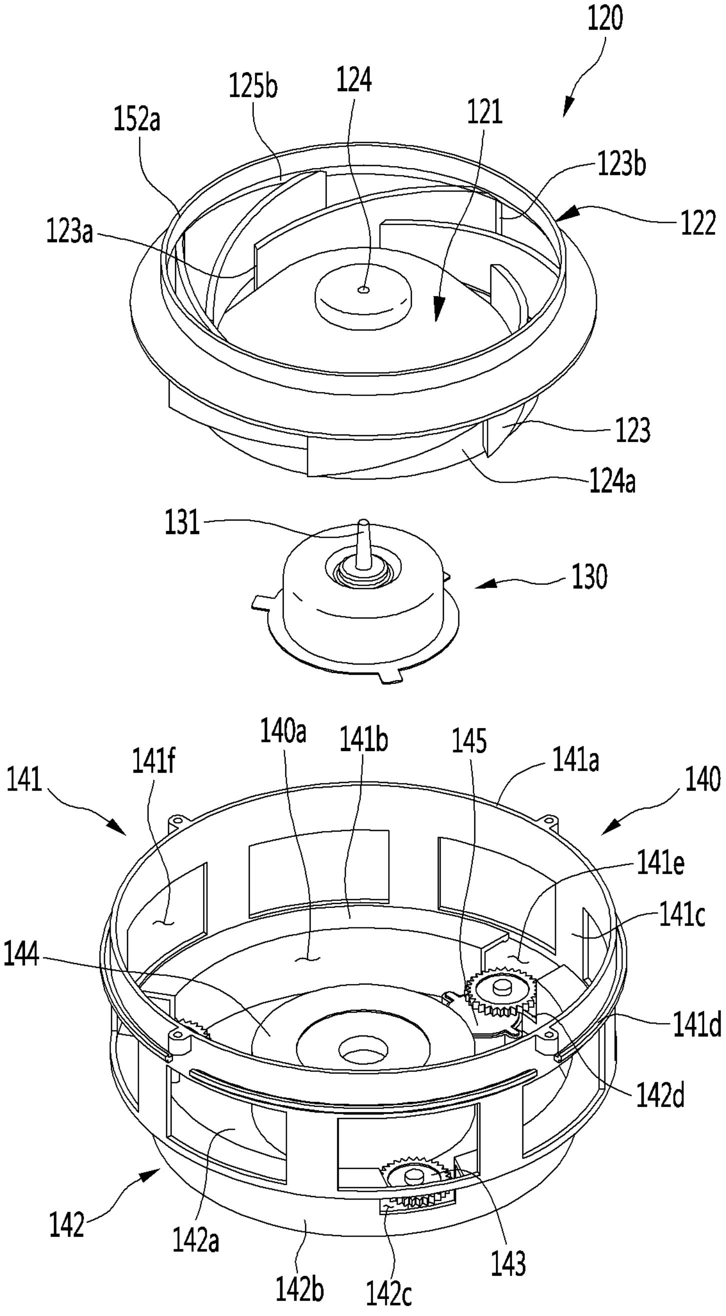
FIG. 6 is an exploded view of a first flow generator according to an embodiment of the present invention.
Figure 7:
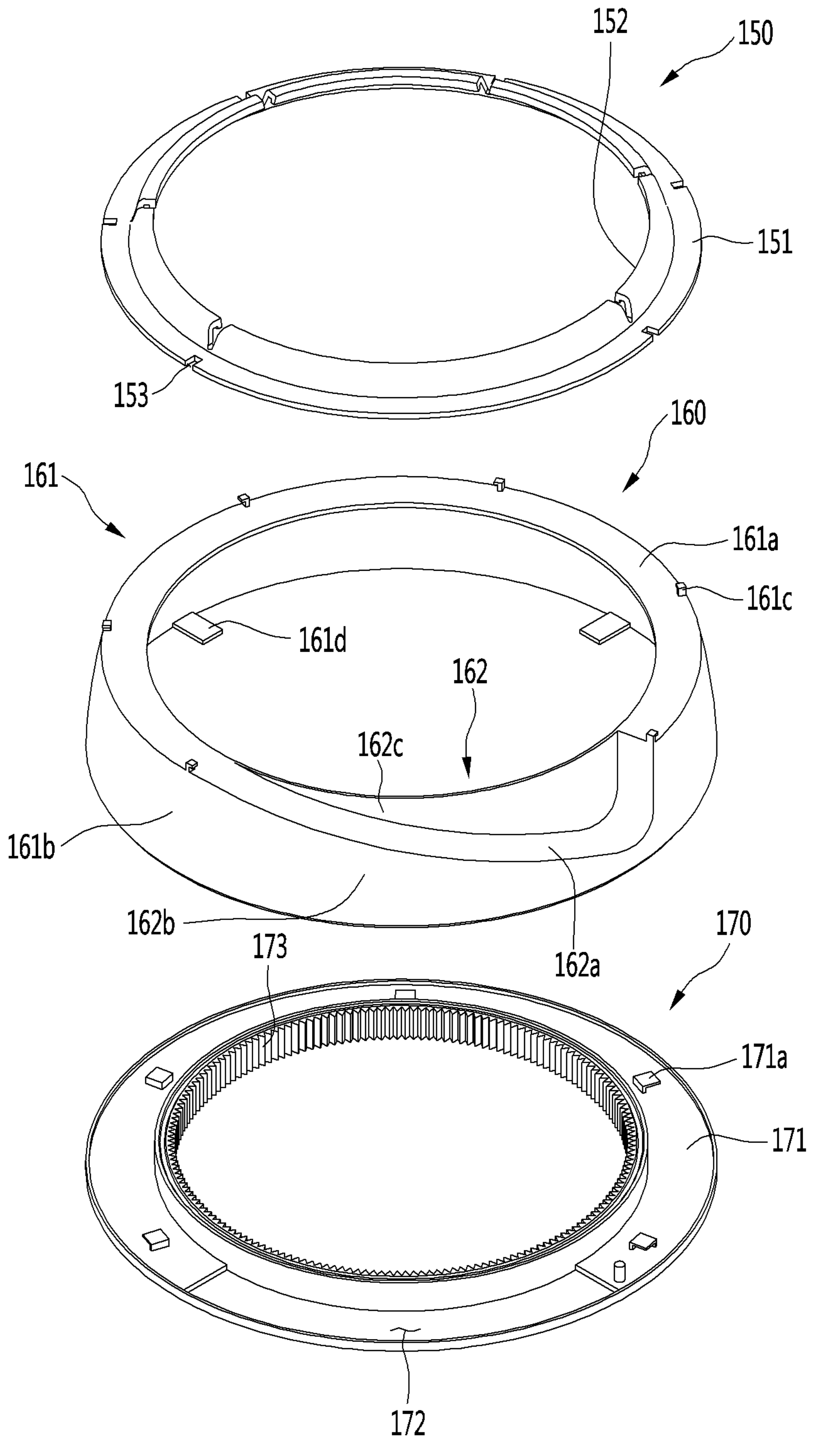
FIG. 7 is an exploded view of a first rotation discharging part according to an embodiment of the present invention.
Figure 8:
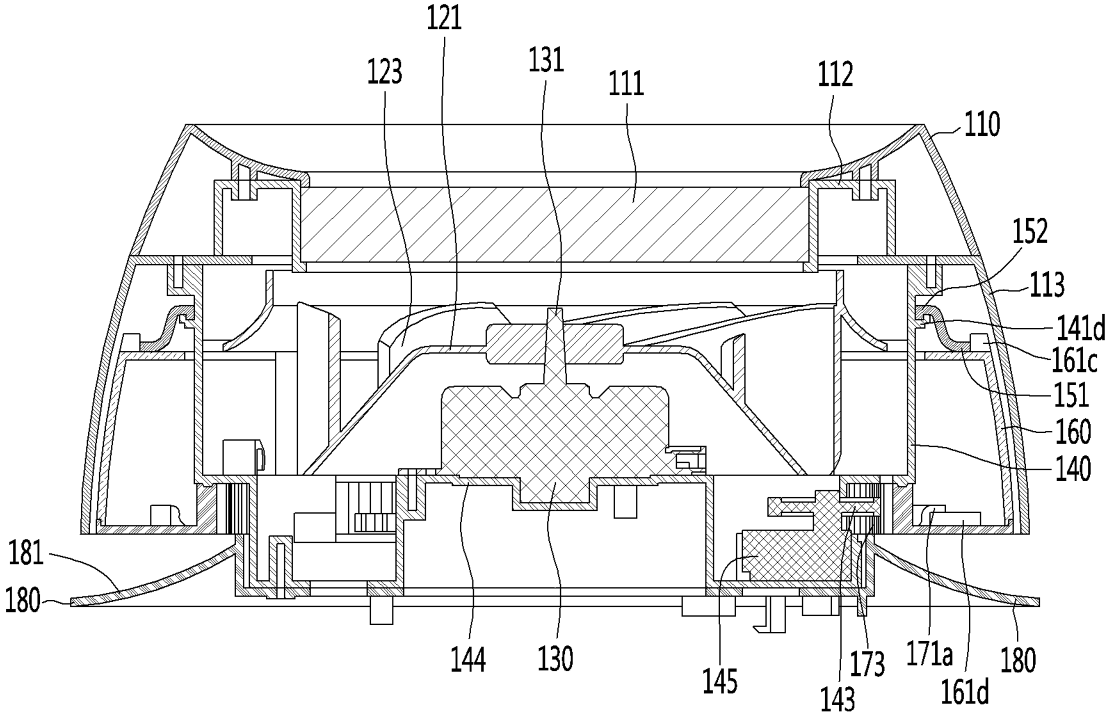
FIG. 8 is a cross-sectional view of a first blowing unit according to an embodiment of the present invention.
Figure 9:
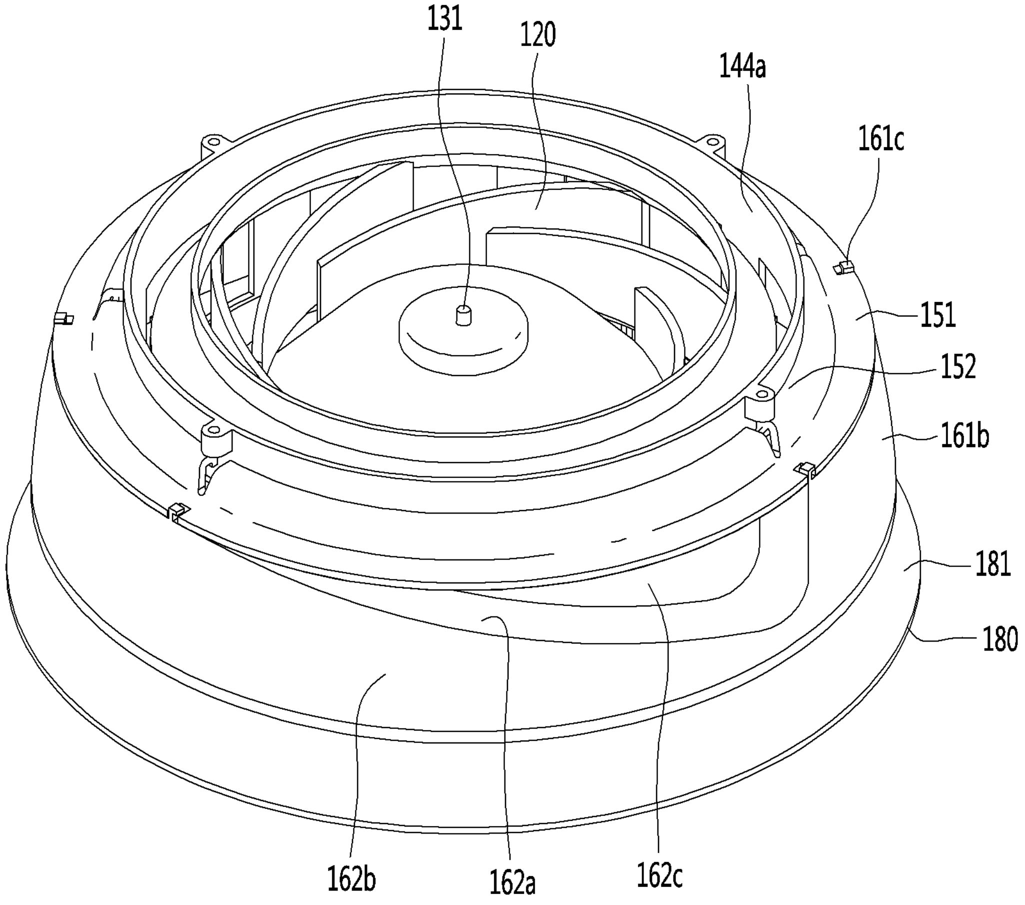
FIG. 9 is a perspective view of a first blowing unit according to an embodiment of the present invention, from which a first case and a first suction part are removed.

FIG. 3 is a cross-sectional view of a main body of a blowing device according to an embodiment of the present invention, FIG. 4 is an exploded view of a blowing device according to an embodiment of the present invention, FIG. 5 is an exploded view of a first suction part and a first case according to an embodiment of the present invention, FIG. 6 is an exploded view of a first flow generator according to an embodiment of the present invention, FIG. 7 is an exploded view of a first rotation discharging part according to an embodiment of the present invention, FIG. 8 is a cross-sectional view of a first blowing unit according to an embodiment of the present invention, and FIG. 9 is a perspective view of a first blowing unit according to an embodiment of the present invention, from which a first case and a first suction part are removed.

Referring to FIGS. 3 to 9, the main body 10 may include the first blowing unit 100 and the second blowing unit 200. The first blowing unit 100 may be understood as an independent blowing unit capable of sucking air from the upper side of the main body 10 and discharging air in a lateral direction.

The first blowing unit 100 may include a first suction part 110 disposed at an upper portion thereof to suck indoor air from above. The first suction part 110 may include a first suction opening 110*a* formed in a substantially ring shape to suck air. In addition, the upper portion of the first suction part 110 may have a smaller diameter than the lower portion thereof. That is, the first suction part 110 may have a truncated cone shape.

The height of the outer circumferential surface of the first suction part 110 may be greater than that of the inner circumferential surface thereof. That is, an extension extending from the outer circumferential surface to the inner circumferential surface of the first suction part 110 may be rounded downward.

A filter mounting part 112, on which a filter is mounted, may be disposed at the inner circumferential side of the first suction part 110. The filter mounting part 112 may be formed in a substantially ring shape and may have a filter mounting opening 112*a*, in which a filter 111 is mounted, in the central portion thereof. In this case, the size of the filter mounting opening 112*a* may be substantially equal to that of the first suction opening 110*a* of the first suction part 110.

The outer circumferential surface of the filter 111 may have a disk shape having a diameter corresponding to that of the filter mounting opening 112*a*, and may be fitted into the filter mounting opening 112*a*. In addition, the filter 111 may be disposed in the first suction opening 110*a* of the first suction part 110, and air introduced through the first suction part 110 is filtered by the filter 111 to remove fine dust or foreign material from the air.

In addition, a plurality of first protrusion ribs 112*b* protruding from the center of the filter mounting part 112 in a radial direction may be provided on the outer surface of the filter mounting part 112. The plurality of first protruding ribs 112*b* may be spaced apart from each other at a predetermined interval along the circumferential surface of the filter mounting part 112. The first protruding ribs 112*b* of the filter mounting part 112 may be coupled to first bent ribs 113*b* formed in the upper surface 113*a* of a first case 113 which will be described below.

The first blowing unit 100 may further include the first case 113 coupled to the lower portion of the first suction part 110. The first case 113 forms the appearance of the first blowing unit 100. Specifically, the first case 113 may have a substantially ring shape and the diameter of the upper portion of the first case 113 may be substantially equal to that of the lower portion of the first suction part 110. In addition, the lower portion of the first case 113 may have a larger diameter of the upper portion of the first case 113. That is, the first case 113 may have a truncated cone shape.

The first case 113 may have an upper surface 113*a* provided between the outer circumferential surface and the inner circumferential surface thereof to extend in a radial direction. The upper surface 113*a* may be configured to have a width set in a radial direction. The lower surface of the first suction part 110 is coupled to the upper surface 113*a* of the first case 113. For example, the first suction part 110 and the first case 113 may have an outer circumferential surface smoothly extending when viewed from the outside. The outer circumferential surface extending from the upper portion to the lower portion of the first case 113 may be formed to have a predetermined curvature.

In addition, the first bent ribs 113*b*, into which the first protrusion ribs 112*a* of the filter mounting part 112 are fitted, may be formed in the upper surface 113*a* of the first case 113. The plurality of first bent ribs 113*b* corresponding in number to the number of first protruding ribs 112*a* may be provided. Specifically, each first bent rib 113*b* may have a shape bent in a "¬" shape. In order to couple the filter mounting part 112 to the first case 113, when the filter mounting part 112 is disposed on the upper surface of the first case 113 and then is rotated, the first protruding ribs 112*a* may be fitted into the first bent ribs 113*b*.

A plurality of protrusion ribs 113*c* is provided on the upper surface 113*a* of the first case 113. In addition, a plurality of coupling grooves, into which the plurality of protrusion ribs 113*c* is capable of being fitted, may be formed in the lower surface of the first suction part 110. By fitting the plurality of second protrusion ribs 113*c* into the plurality of coupling grooves, it is possible to stably couple the upper surface of the first case 113 and the lower surface of the first suction part 110.

A first flow generator may be provided at the inner circumferential surface side of the first case 113. Specifically, the first flow generator may generate flow of air sucked into the first suction part 110 and flow of air discharged to the first rotation discharging part.

The first flow generator will be described in detail.

The first flow generator may include a first fan 120 that rotates, a first fan motor 130 for transmitting rotational force to the first fan 120 and a first fan housing 140 in which the first fan 120 and the first fan motor 130 are received.

The first fan motor 130 may be coupled to the first fan housing 140 to transmit drive force to the first fan 120. Specifically, the rotation shaft 131 of the first fan motor 130 is coupled to the first fan 120. The configuration of the first fan motor 130 is not limited as long as the motor is capable of being coupled to the fan.

The first fan 120 may be coupled to the first fan motor 130 to rotate. For example, the first fan 120 may include a centrifugal fan for introducing air in an axial direction and discharging air in a downward radial direction.

Specifically, the first fan 120 may include a hub 121 coupled to the rotation shaft 131 of the first fan motor 130, a shroud 122 spaced apart from the hub 121 and a plurality of blades 123 disposed between the hub 121 and the shroud 122.

The hub 121 may have a shape of a bowl which gradually becomes narrower upward. In addition, the hub 121 may include an axial coupling part 131, to which the rotation shaft 131 is capable of being coupled, and a first blade coupling part 124*a* extending from the axial coupling part 124 downward.

The shroud 122 may include an upper end in which a shroud suction port 125*a* for sucking air passing through the first suction part 110 is formed, and a second blade coupling part 125*b* extending from the upper end downward to be coupled to the blades 123.

One surface of each blade 123 may be coupled to the first blade coupling part 124*a* of the hub and the other surface thereof may be coupled to the second blade coupling part 125*b* of the shroud 122. In addition, the plurality of blades 123 may be spaced apart from each other in the circumferential direction of the hub 121.

Each blade 123 may include a leading edge 123*a* forming a side end, through which air is introduced, and a trailing edge 123*b*, through which air is discharged.

Air sucked through the first suction part 110 and passing through the filter 111 flows downward and flows in the axial direction of the first fan 120 to be introduced through the leading edge 123*a* and to be discharged through the trailing edge 123*b* of each blade. At this time, the trailing edge 123*b* may extend to be inclined outward and downward in the axial direction in correspondence with the air flow direction such that air discharged through the trailing edge 123*b* flows in the downward radial direction.

The first fan housing 140 may include a first housing part 141 in which the first fan 120 and the first fan motor 130 are received and a second housing part 142 disposed below the first housing part 141. A reception space 140*a* in which the first fan 120 and the first fan motor 130 are received is formed in the first housing part 141 and the second housing part 142.

The first housing part 141 may include a first upper surface part 141*a* having a ring shape and disposed at the upper portion of the first housing part 141, a first lower surface part 141*b* having a ring shape and disposed at the lower portion of the first housing part 141, and a plurality of first extensions 141*c* extending from the first upper surface portion 141*a* to the first lower surface portion 141*b*.

The first upper surface portion 141*a* may have a ring shape. The outer circumferential surface of the first upper surface portion 141*a* may include second bent ribs 141*d* extending by a predetermined length in the circumferential direction. Each second bent rib 141*d* may have a shape protruding in an outer radial direction of the first upper surface portion 141*a* and bent upward, for example, a "⌊" shape.

In addition, the second bent ribs 141*d* may extend in the circumferential direction of the first upper surface portion 141*a* to guide rotation of a guide support 150 which will be described below. The coupling structure of the plurality of second bent ribs 141*d* and the guide support 150 will be described below.

The plurality of first extensions 141*c* extends from the lower end of the first upper surface portion 141*a* to the first lower surface part 141*b* and may be spaced apart from each other at a predetermined interval in the circumferential direction of the first housing part 141. A discharging hole 121*f* for discharging air passing through the first fan 120 may be formed between the plurality of first extensions 141*c*.

The first lower surface part 141*b* may have a ring shape. Specifically, the first lower surface part 141*b* may include a plurality of first recessed part 141*e* recessed from the inner circumferential surface of the first lower surface part 141*b* in the radial direction. Specifically, the plurality of first recessed parts 141 may be spaced apart from each other at a predetermined interval in the circumferential direction of the first lower surface part 141*b*.

The second housing part 142 may be connected to the lower portion of the first housing part 141 and may have a cylindrical shape with an opened upper portion. Specifically, the second housing part 142 may include a first side surface part 142*b*, a second lower surface part 142*a* and a first fan motor coupling part 144.

The first side surface part 142*b* may extend from the first lower surface portion 141*b* of the first housing part 141 downward and have a ring shape. The first side surface part 142*b* may include a plurality of second recessed parts 142*c* recessed from the upper portion of the first side surface part 142*b* downward. The second recessed parts 142*c* may be spaced apart from each other at a predetermined interval in the circumferential direction of the first side surface part 142*b*.

The first recessed parts 141*e* and the second recessed parts 142*c* may be vertically aligned and the recessed spaces of the first recessed parts 141*e* and the recessed spaces of the second recessed parts 142*c* may communicate with each other. A first pinion gear 143 which will be described below may be exposed to the outside of the first fan housing 140 through the communicated recessed spaces.

In addition, the first side surface part 142*b* may include a first pinion gear coupling surface 142*d* extending from the lower end of the second recessed part 142*c* in the center direction to be coupled to the first pinion gear 143. For example, the first pinion gear coupling surface 142*d* may have a surface parallel to the main body of the first lower surface part 141*b*.

When the first pinion gear 143 is coupled to the first pinion gear coupling surface 142*d*, a portion of the first pinion gear 143 may protrude to the outside of the first side surface part 142*b* through the recessed spaces of the first recessed parts 141*e* and the second recessed parts 142*c*, which vertically communicate with each other. The first pinion gear 143 is engaged with a first rack gear 173 of a first discharging part 170 which will be described below and operation thereof will be described below.

The first recessed parts 141*e* and the second recessed parts 142*c* may be arranged in the radial direction of the center of the first fan housing 140 and the number thereof may be three. In this case, the number of first pinion gears 143 may also be three. In this case, the three first pinion gears 143 may be arranged at the vertexes of an equilateral triangle.

The second lower surface part 142*a* may extend from the lower portion of the first side surface part 142*b* and may form the lower surface of the first fan housing 140. The first fan motor coupling part 144 may protrude from the center of the second lower surface part 142*a* upward, and the first fan motor 130 may be coupled to the first fan motor coupling part 144. A first gear motor 145 for generating drive force for rotating the first pinion gear 143 may be disposed on the second lower surface 142*a*.

The first blowing unit 100 may further include a first rotation discharging part disposed between the first flow generator and the first case 113 to guide and discharge air generated by the first flow generator to the outside. The first rotation discharging part may be rotated in the circumferential direction. That is, the first rotation discharging part may be rotatably connected to the first flow generator.

Specifically, the first rotation discharging part may include a first flow guide part 160 for guiding air flow generated by the first flow generator and a first discharging part 170 disposed below the first flow guide part 160 to discharge air passing through the first flow guide part 160 to the outside.

The first flow guide part 160 may be formed in a ring shape. The diameter of the upper end of the first flow guide part 160 may be less than that of the lower end of the first flow guide part 160. That is, the first flow guide part 160 may have a truncated cone shape. The first flow guide part 160 may guide air flowing by the first fan 120.

Specifically, the first flow guide part 160 may include a first flow passage part 161 for providing a passage, through which air generated by the first flow generator flows, and a first guide flow passage 162 for guiding air flow from the first flow passage part downward. For example, the first guide flow passage 162 may guide air to flow in a lower direction inclined from the axial direction.

The first flow passage part 161 may have a C shape obtained by cutting out at least a portion of a ring shape. The first flow passage part 161 includes a side surface 161*b* forming appearance thereof and an upper surface 161*a* bent from the upper end of the side surface 161*b* in the center direction. A flow passage, through which air may flow, may be formed through a space between the side surface 161*b* and the upper surface 161*a* of the first flow passage part 161.

The first guide flow passage 162 may be disposed to extend in the cut-out portion of the first flow passage part 161. Specifically, the first guide flow passage 162 may include a first inclined surface 162*a* obliquely extending from the upper surface of the first flow passage part 161 downward and a first guide connection part 162*b* extending from the side surface of the first flow passage part 161 and bent from the outer portion of the first inclined surface 162*a* downward, and a second guide connection part 162*c* bent from the inner portion of the first inclined surface 162*a* upward.

A flow passage, through which air is guided, may be formed through an inclined space formed by the first guide connection part 162*b*, the first inclined surface 162*a* and the second guide connection part 162*c*. Air flowing through the first flow passage part 161 may be guided to the first discharging part 170 through the flow passage formed by the first guide connection part 162*b*, the first inclined surface 162*a* and the second guide connection part 162*c*.

Third bent ribs 161*c* may be formed on the upper surface of the first flow passage part 161. The third bent ribs 161*c* may be coupled with guide supports 150 which will be described below and the coupling relationship between the third bent ribs and the guide supports 150 will be described below. Specifically, the third bent ribs 161*c* may be disposed on the upper surface of the first flow passage part 161 in a "¬" shape. The plurality of third bent ribs 161*c* may be provided. The plurality of third bent ribs 161*c* may be spaced apart from each other at a predetermined interval in the circumferential direction of the first flow passage part 161.

In addition, third protrusion ribs 161*d* protruding in the center direction may be provided on the lower inner circumferential surface of the first flow passage part 161. The third protruding ribs 161*d* may be coupled with fourth bent ribs 171*a* of the first discharging part 170 and the coupling relationship between the third bent ribs and the fourth bent ribs 171*a* will be described below. A plurality of third protruding ribs 161*d* may be provided. In this case, the third protruding ribs 161*d* may be spaced apart from each other at a predetermined interval in the circumferential direction of the third flow passage part.

The first discharging part 170 is disposed below the first flow guide part 160 to discharge the air guided from the first flow passage guide part to the outside. The first discharging part 170 may include a first discharging-part main body 171 having a ring shape and a first rack gear 173 protruding from the first discharging-part main body 171 upward.

Specifically, the first discharging-part main body 171 has a ring shape. In addition, a first discharging port 172 for guiding discharge of air is formed in the first discharging-part main body 171. The first discharging port 172 may be formed by a set width in the circumferential direction of the first discharging-part main body 171. The width of the first discharging port 172 may be equal to the circumferential width of the first guide flow passage 162. The air guided through the first guide flow passage 162 of the first flow guide part 160 may be discharged through the first discharging port 172 downward.

A fourth bent ribs 171*a* may be provided on the upper surface of the first discharging-part main body 171. Specifically, the fourth bent rib 171*a* may be bent in a "¬" shape. A plurality of fourth bent ribs 171*a* may be provided and spaced apart from each other at a predetermined interval in the circumferential direction of the first discharging-part main body 171.

When the first flow guide part 160 is seated in the first discharging-part main body 171 and then is rotated, the third protruding ribs 161*d* on the lower surface of the third the first flow passage part 161 may be fitted into the fourth bent ribs 171*a* of the first discharging-part main body 171 to couple the first flow guide part 160 to the first discharging part 170.

The first guide flow passage 162 of the first flow guide part 160 and the first discharging port 172 are vertically disposed, and the flow passage formed in the first guide flow passage 162 may communicate with the first discharging port 172. Therefore, the air guided through the first guide flow passage 162 may be discharged to the outside through the first discharging port 172.

The first rack gear 173 may be configured to protrude from the inner circumferential surface of the first discharging-part main body 171 upward and to extend in the circumferential direction. A plurality of gear teeth may be provided on the inner circumferential surface of the first rack gear 173.

The first rotation discharging part may further include a guide support 150 supporting the first flow guide part 160. The guide support 150 may have a substantially ring shape. The guide support 150 may support the first flow guide part 160 such that the first flow guide part 160 and the first fan housing 140 are coupled to prevent the first flow guide part 160 from being detached downward.

Specifically, the guide support 150 may include a seating part 151 seated in the first flow guide part 160 and a coupling part 152 extending from the seating part 151 upward. The inner portion of the coupling part 152 may be bent downward to be coupled to the first fan housing 140.

The seating part 151 has a ring shape. The lower surface of the seating part 151 may be seated on the upper surface the first flow guide part 160. In addition, a plurality of second coupling grooves 153 spaced apart from each other at a predetermined interval may be formed in the seating part 151 in the circumferential direction.

Specifically, when the seating part 151 is seated on the upper surface of the first flow guide part 160 such that the third bent ribs 161*c* formed on the upper surface of the first flow passage part 161 are inserted into the second coupling grooves 153 and then the guide support 150 is rotated, the lower portion of the seating part 151 may be locked by the third bent ribs 161*c* and thus the guide support 150 may be coupled to the upper surface of the first flow guide part 160.

The coupling part 152 has a ring shape. In addition, the coupling part 152 may protrude from the inner circumferential surface of the seating part 151 upward, extend in an inner radial direction, and then be bent downward. That is, the coupling part 152 may have a hook shape.

When the coupling part 152 is coupled to the second bent ribs 141*d* formed on the first fan housing 140, the guide support 150 may be coupled to the first fan housing 140. The extension direction of the coupling part 152 and the extension direction of the second bent ribs 141*d* may correspond to each other in the circumferential direction. When the first flow guide part 160 is rotated, the coupling part 152 may be guided along the second bent rib 141*d* to be rotated in the circumferential direction.

Since the diameter of the first blowing unit 100 is gradually increased from the upper portion to the lower portion thereof, there is problem that the first rotation discharging part may be detached downward or the position thereof may be deviated. Accordingly, the first rotation discharging part is rotatably coupled to the first fan housing 140 using the guide support 150, thereby preventing the first rotation discharging part from being detached downward or the position thereof from being deviated.

The first blowing unit 100 may further include a first flow changing part 180 disposed below the first rotation discharging part to change flow of air discharged from the first rotation discharging part in a lateral direction. The first flow changing part 180 may be formed in a ring shape and the upper surface thereof may be inclined downward from the center to the outside thereof. The flow direction of the air discharged from the first rotation discharging part downward may be changed to the lateral direction by the inclined surface of the first flow changing part 180.

Hereinafter, the rotation configuration of the first rotation discharging part will be described in detail.

Figure 10:
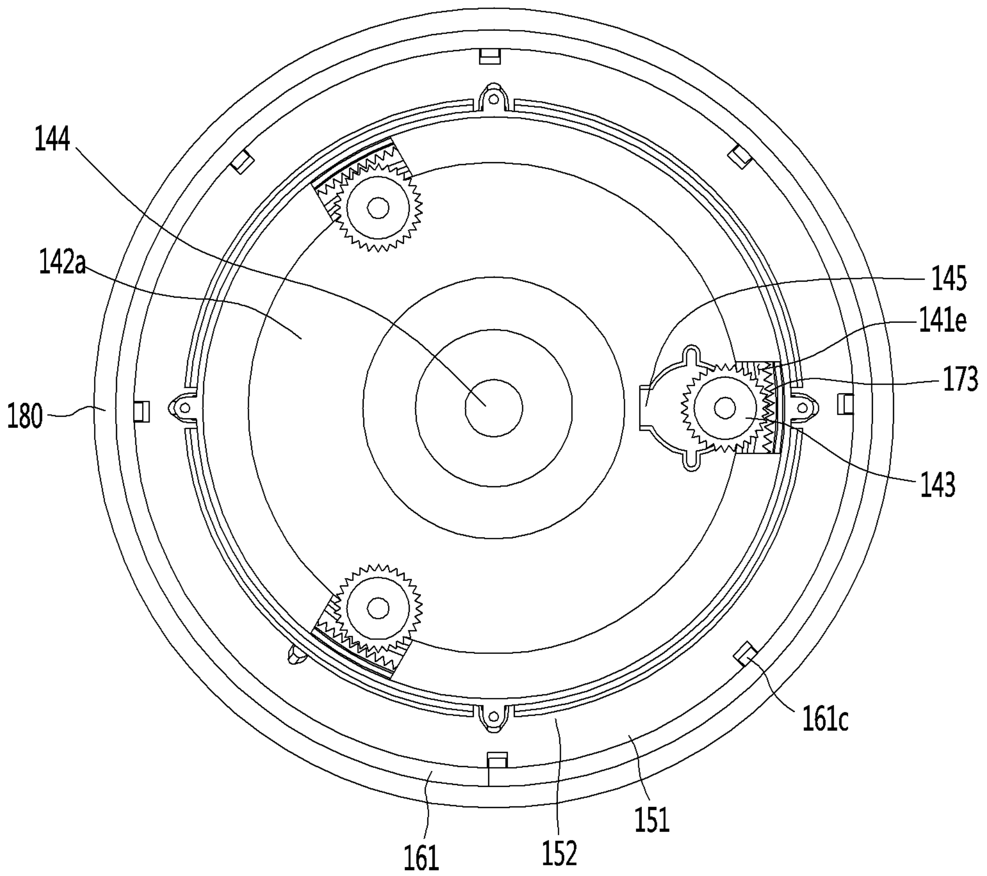
FIG. 10 is a top view showing the coupling state of a first pinion gear and a first rack gear of a first blowing unit according to an embodiment of the present invention.
Figure 11:
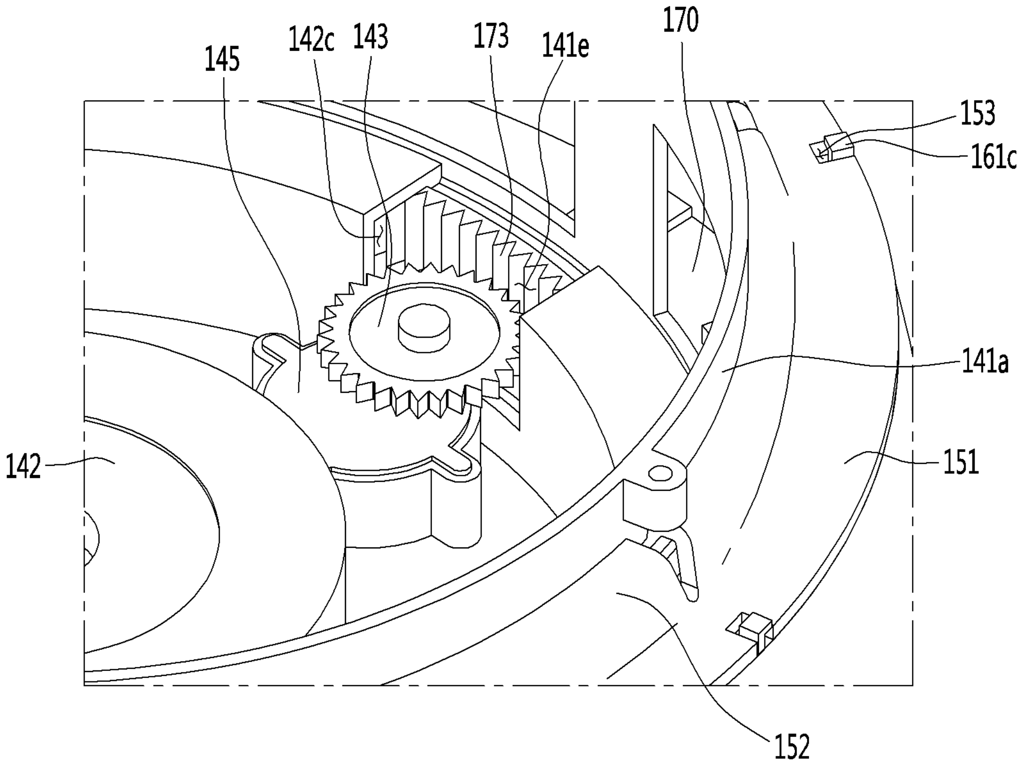
FIG. 11 is a perspective view showing the coupling state of a first pinion gear and a first rack gear of a first blowing unit according to an embodiment of the present invention.

FIG. 10 is a top view showing the coupling state of the first pinion gear and the first rack gear of the first blowing unit according to the embodiment of the present invention, and FIG. 11 is a perspective view showing the coupling state of the first pinion gear and the first rack gear of the first blowing unit according to the embodiment of the present invention.

Referring to FIGS. 10 and 11, the plurality of first pinion gears 143 coupled to the first fan housing 140 may be exposed to the outside of the first fan housing 140 by the first recessed parts 141*e* and the second recessed parts 141*c*. In this state, when the first rotation discharging part is disposed, the first rack gear 173 of the first discharging part 170 of the configuration of the first rotation discharging part may be engaged with the first pinion gear 143.

In this case, the first gear motor 145 coupled to any one of the plurality of first pinion gears 143 is driven to rotate the first pinion gear 143, the first rack gear 173 may be rotated by the first pinion gear 143. By rotation of the first rack gear 173, the first discharging part 170 may be rotated and the first flow guide part 160 coupled to the first discharging part 170 may also be rotated.

That is, the first flow guide part 160 and the first discharging part 170 may be rotated by 360 degrees in the circumferential direction. Thus, the air introduced through the first suction part 110 may be laterally discharged according to the rotation direction of the first flow guide part 160 and the first discharging part 170.

Hereinafter, the second blowing unit 200 will be described in detail. The shape of the second blowing unit 200 may be equal to the shape of the first blowing unit 100 which is turned upside down. That is, if the first blowing unit 100 has a truncated cone shape having a diameter gradually decreased from the upper portion to the lower portion thereof, the second blowing unit 200 has a truncated cone shape having a diameter gradually decreased from the lower portion to the upper portion thereof.

Figure 12:
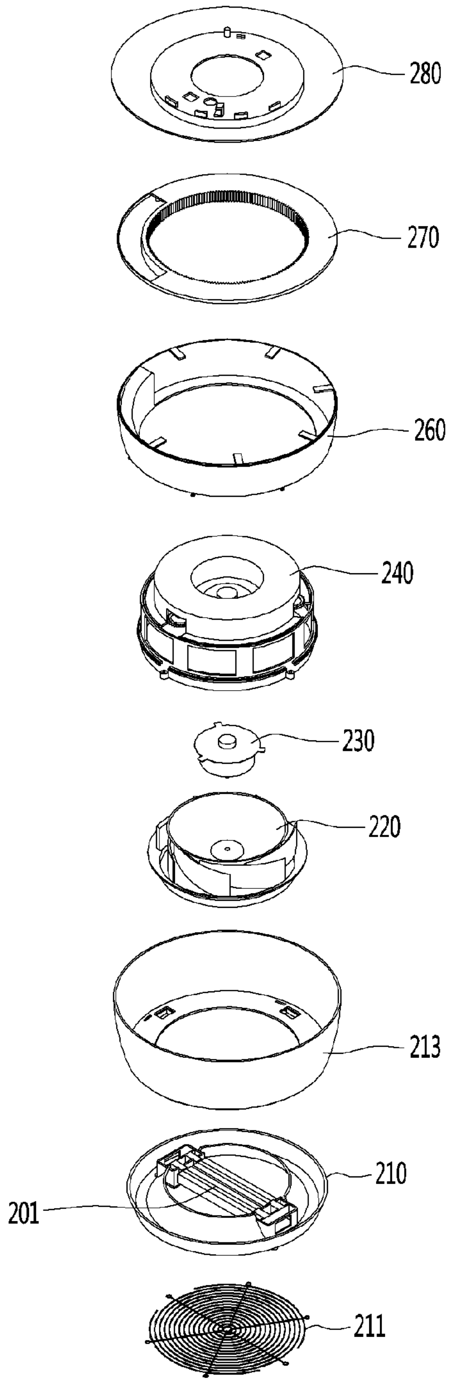
FIG. 12 is an exploded view of a second blowing unit according to an embodiment of the present invention.
Figure 13:
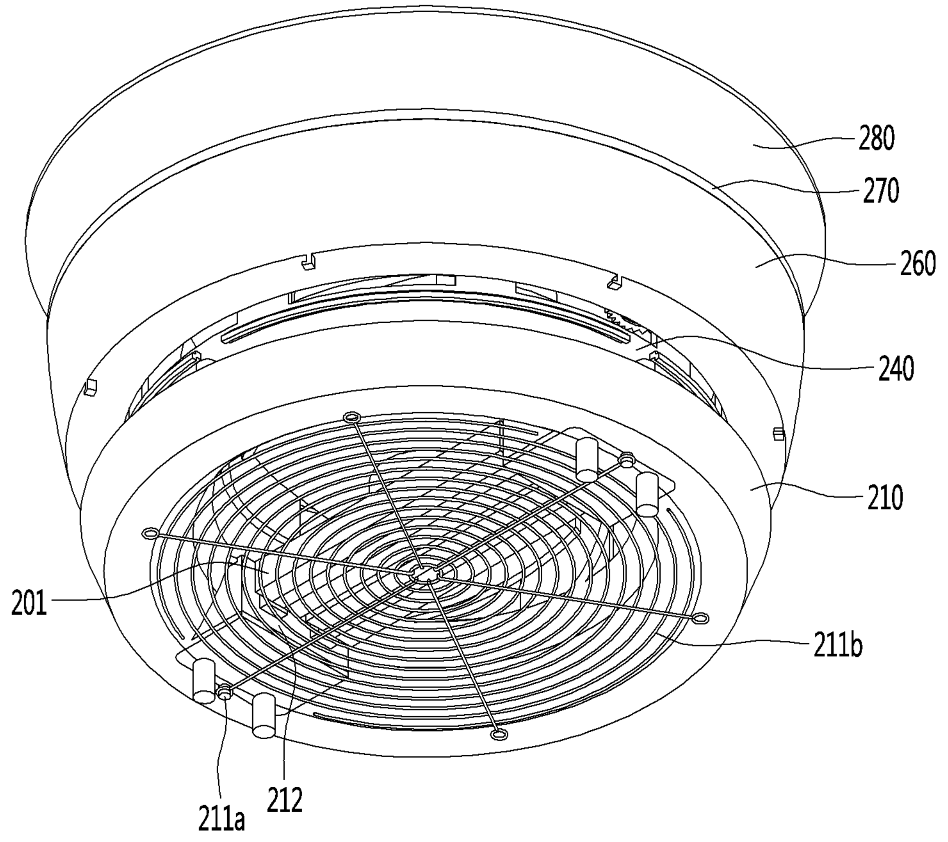
FIG. 13 is a perspective view of a second blowing unit according to an embodiment of the present invention, from which a second case is removed.
Figure 14:
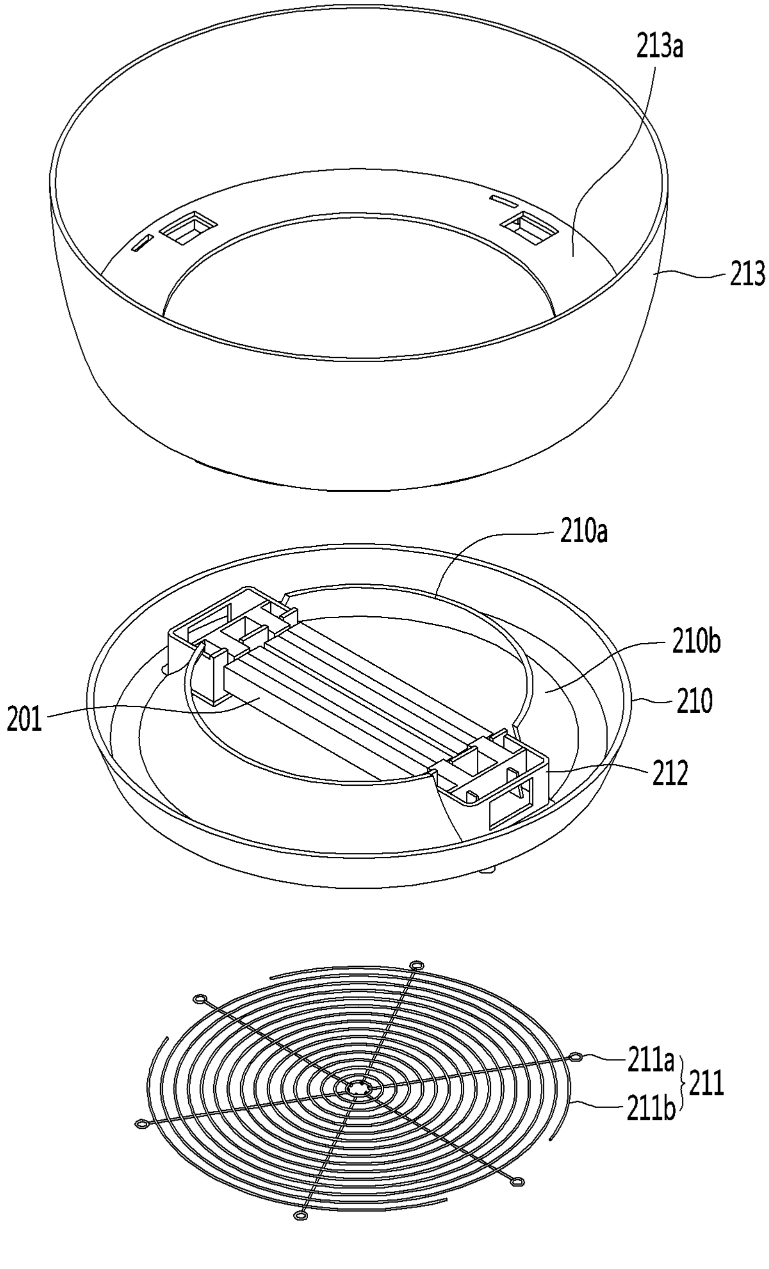
FIG. 14 is an exploded of a second suction part and a second case according to an embodiment of the present invention.
Figure 15:
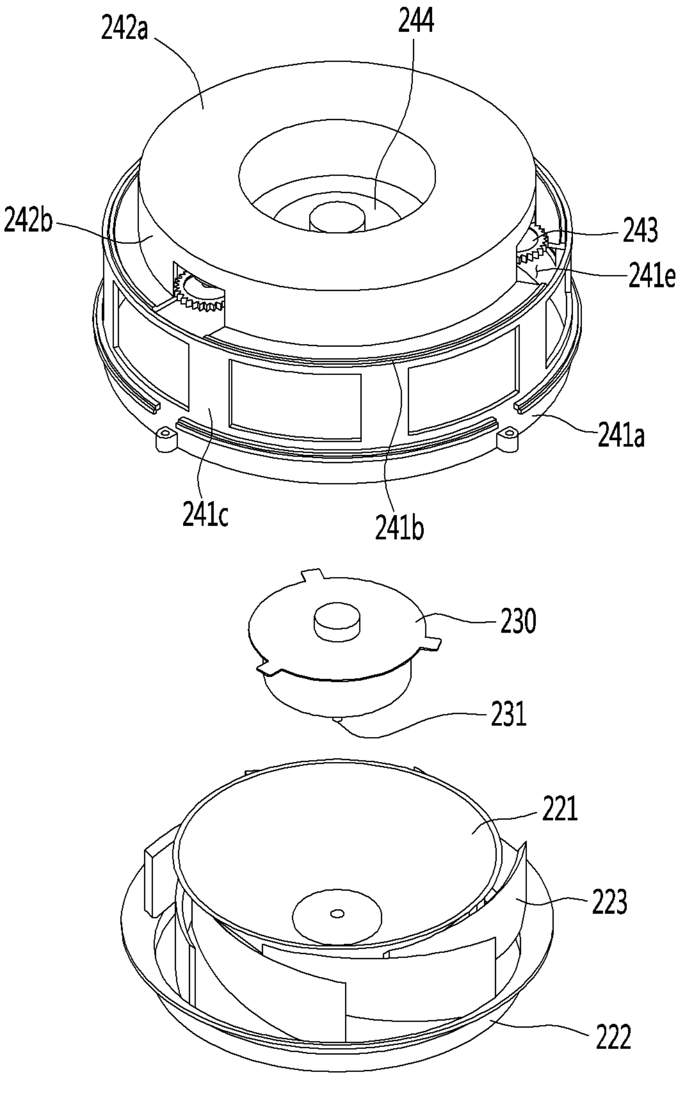
FIG. 15 is an exploded view of a second flow generator according to an embodiment of the present invention.
Figure 16:
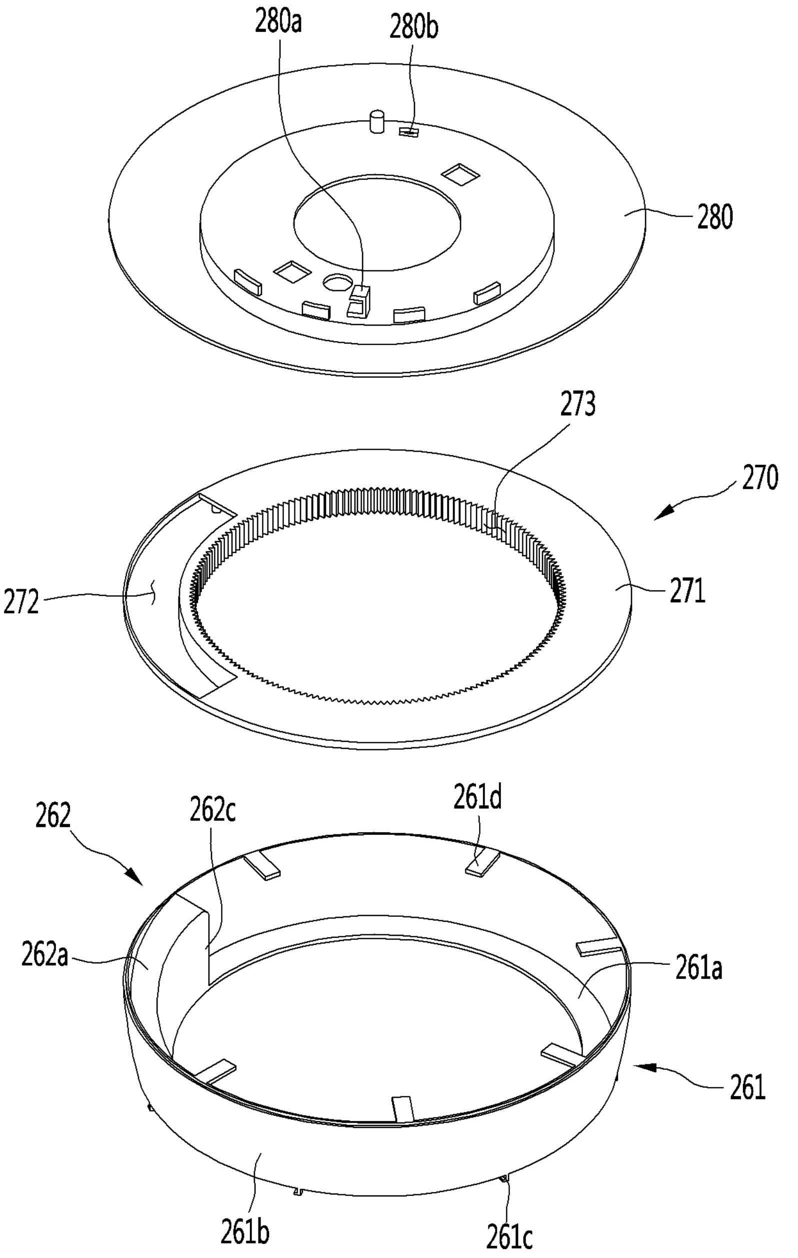
FIG. 16 is an exploded view of a second rotation discharging part and a second flow changing part according to an embodiment of the present invention.
Figure 17:
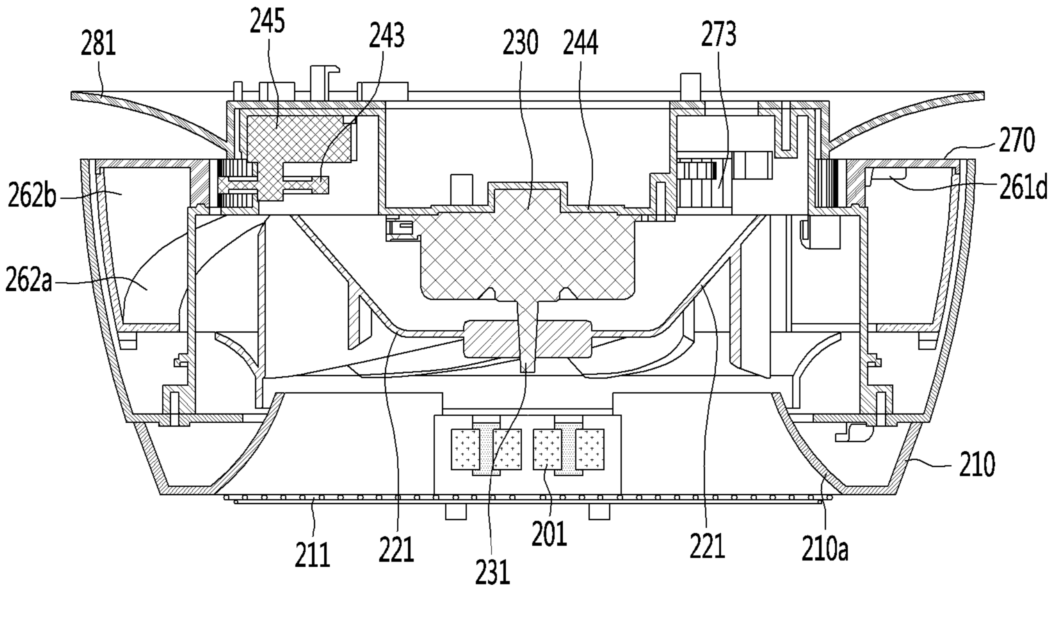
FIG. 17 is a cross-sectional view of a second blowing unit according to an embodiment of the present invention.

FIG. 12 is an exploded view of the second blowing unit according to the embodiment of the present invention, FIG. 13 is a perspective view of the second blowing unit according to the embodiment of the present invention, from which a second case is removed, FIG. 14 is an exploded of a second suction part and a second case according to the embodiment of the present invention, FIG. 15 is an exploded view of a second flow generator according to the embodiment of the present invention, FIG. 16 is an exploded view of a second rotation discharging part and a second flow changing part according to the embodiment of the present invention, and FIG. 17 is a cross-sectional view of the second blowing unit according to the embodiment of the present invention.

Referring to FIGS. 12 to 17, the second blowing unit 200 may include a second suction part 210, a second flow generator, a second flow guide part 260 and a second flow changing part 280.

The second suction part 210 may be disposed at the lower portion of the second blowing unit 200 to suck indoor air. Specifically, the second suction part 210 may include a second suction opening 210*a* formed in a substantial ring shape to suck air. In addition, the lower portion of the second suction part 210 has a smaller diameter than the upper portion thereof.

The height of the outer circumferential surface of the second suction part 210 may be greater than that of the inner circumferential surface thereof. That is, a suction extension 210*b* extending from the outer circumferential surface to the inner circumferential surface of the second suction part 210 may be inclined or rounded downward.

A heater 301 may be disposed on the suction extension 210*b*. Specifically, heater mounting parts 212 coupled with the heater 201 may be provided on the suction extension 210*b*. Specifically, the heater mounting parts 212 may be disposed at one side and the other side of the suction extension 210*b* to support both ends of the heater 201. Each of the heater mounting parts 212 may have a fitting groove formed at one side thereof such that the one end and the other end of the heater 201 are fitted. This coupling method is merely exemplary and the coupling method is not limited thereto if the heater 201 is coupled to the heater mounting parts 212.

The heater 201 has a rod shape and the one end and the other end thereof may be fitted into the fitting grooves of the heater mounting parts 212. In this case, the heater 201 is a heating source for selectively heating the air introduced through the second suction part 210 and may include, for example, a PTC heater. There is no limitation on the type of the heater.

A grill 211 may be disposed below the second suction part 210. For example, the grill 211 may be disposed below the second suction opening 210*a*, thereby preventing the user's hand from being inserted into the heater 201. The grill 211 may include a plurality of first grills 211*a* extending radially from the center thereof and having one end coupled to the lower surface of the second suction part 210 and a plurality of second grills 211*b* connected to the first grills 211*a* and having a circular shape.

The grill 211 is formed of a metal material and thus is heated when the heater 201 is heated, such that the air introduced through the second suction part 210 is entirely and uniformly heated.

As the heater 201 and the grill 211 are disposed in the second suction part 210, the user can discharge cool air by not driving the heater in the hot weather such as in summer and can discharge warm air by driving the heater 201 in the cold weather such as in winter.

The second case 213 may be connected to the upper portion of the second suction part 210 to form the appearance of the second blowing unit 200. For example, the second case 213 may have a substantially hollow cylindrical shape.

The diameter of the lower portion of the second case 213 may be substantially equal to that of the upper portion of the second suction part 210, and the upper portion of the second case 213 may have a larger diameter than the lower portion thereof. That is, the second case 213 may have the same shape as the first case 113 which is turned upside down. The outer circumferential surface of the second case 213 may be rounded to have a predetermined curvature.

A second flow generator may be disposed at the inner circumferential surface side of the second case 213. Specifically, the second flow generator may generate flow of air sucked into the second suction part 210 and a second airflow discharged to the second rotation discharging part.

The second flow generator will be described in detail.

The second flow generator may have the same shape as the first flow generator which is turned upside down. Specifically, the second flow generator may include a second fan 220 that is rotated, a second fan motor 230 for transmitting rotational force to the second fan 220 and a second fan housing 240 in which the second fan 220 and the second fan motor 230 are received.

The second fan motor 230 includes a rotation shaft 231 coupled to the second fan 220 and transmit drive force to the second fan 220 through the rotation shaft 231. The second fan motor has the same structure as the first fan motor 130 except that the upper and lower sides thereof are inverted and thus a detailed description thereof will be omitted.

The second fan 220 may be coupled to the second fan motor 230 to be rotated. For example, the second fan 220 may include a centrifugal fan for introducing air in the axial direction and discharging air in the upward radial direction.

Specifically, the second fan 220 may include a hub coupled with the rotation shaft of the second fan 230, a shroud 222 spaced apart from the hub 221 and a plurality of blades 223 disposed between the hub 221 and the shroud 222. The second fan 220 has the same structure as the first fan except that the upper and lower sides thereof are inverted and thus a detailed description will be omitted.

The air passing through the heater 201 from below through the second suction part 210 flows upward and flows in the axial direction of the second fan 220, thereby flowing in the upward radial direction through the blades 223.

The second fan housing 240 may include a first housing part 241 for receiving the second fan 220 and the second fan motor 230 and a second housing part 242 disposed above the first housing part 241. The second housing part 242 has the same shape as the structure obtained by turning the second housing part 242 of the first fan housing 140 upside down and the first housing 241 may have the same shape as the structure obtained by turning the first housing part 141 of the first fan housing 140 upside down. A reception space in which the second fan 220 and the second fan motor 230 are received is formed in the first housing part 241 and the second housing part 242.

The second housing part 242 may include a second upper surface part 242*a*, a second side surface part and a second fan motor coupling part 244, which have the same shape as the structure obtained by turning the second lower surface part 142*a*, the second side surface part 142*b* and the first fan motor coupling part 144 of the second housing part 142 of the first fan housing 140 upside down. Therefore, a repeated description thereof will be omitted.

The first housing part 241 may include a third upper surface part 241*b*, a third lower surface part 241*a* and a second extension 241*c*, which have the same shape as the structure obtained by turning the first lower surface part 141*b*, the first upper surface part 141*a* and the first extension 141*c* of the first housing part 142 of the first fan housing 140 upside down. Therefore, a repeated description thereof will be omitted.

For convenience of description, the second pinion gear 243 is disposed at the position of the second fan housing 240 corresponding to the position of the first fan housing 140 where the first pinion gear 143 is disposed. In addition, a second drive motor 245 for driving the second pinion gear 243 may be connected to the second pinion gear 243.

The second blowing unit 200 may further include a second rotation discharging part disposed between the second flow generator and the second case 213 to guide and discharge air flow generated by the second flow generator to the outside.

The second rotation discharging part may include a second flow guide part 260 for guiding air flow generated by the second flow generator and a second discharging part 270 disposed above the second flow guide part 260 to discharge the guided air to the outside. The second rotation discharging part may be rotated in the circumferential direction.

The second flow guide part 260 and the second discharging part 270 may have the same shape as the first flow guide part 160 of the first rotation discharging part and the first discharging part 170 which are turned upside down.

Specifically, the second flow guide part 260 may include a second flow passage part 261 and a second guide flow passage 262. The second flow passage part 261 and the second guide flow passage 262 have the same configuration as the first flow passage part 161 and the first guide flow passage 162 of the first flow guide part 160 and thus a repeated description thereof will be omitted.

The second discharging part 270 may include a second discharging-part main body 271 having a second discharging port 272 formed therein and a second rack gear 273, which have the same configurations as the first discharging-part main body 172 having the first discharging port 172 formed therein and the first rack gear 173 of the first discharging part 170. Therefore, thus a repeated description thereof will be omitted.

The second rotation discharging part may not include the configuration of the guide support 150 of the first rotation discharging part. The diameter of the first blowing unit 100 is gradually increased from the upper portion to the lower portion thereof, whereas the diameter of the second blowing unit 200 is gradually decreased from the upper portion to the lower portion thereof. Therefore, since the second flow guide part 260 may not be detached downward and thus the second flow guide part 260 may not be supported.

The second blowing unit 200 may further include a second flow changing part 280 disposed above the second rotation discharging part to change flow of air discharged from the second rotation discharging part in the lateral direction. The first flow changing part 180 and the second flow changing part 280 may be referred to as "partitioning devices" because the first flow changing part 180 and the second flow changing part 280 partition the first blowing unit 100 and the second blowing unit 200.

The second flow changing part 280 has a ring shape and the lower surface thereof may be inclined from the center portion thereof to the outside. Therefore, the flow direction of the air discharged from the second rotation discharging part upward may be changed to the lateral direction by the inclined surface of the second flow changing part 280.

The lower surface of the first flow changing part 180 and the upper surface of the second flow changing part 280 may be coupled to each other. Specifically, the upper surface of the first flow changing part 180 and the lower surface of the second flow changing part 280 may be coupled by fitting a rib 280*a* into a groove 280*a*. That is, the rib 280*a* of the second flow changing part 280 may be fitted into the groove of the first flow changing part 180 and the rib 280*a* of the first flow changing part 180 may be fitted into the groove of the second flow changing part 280. By coupling between the first flow changing part 180 and the second flow changing part 280, the first blowing unit 100 and the second blowing unit 200 may configure a main body as one device.

Hereinafter, the rotation configuration of the second rotation discharging part will be described.

Figure 18:
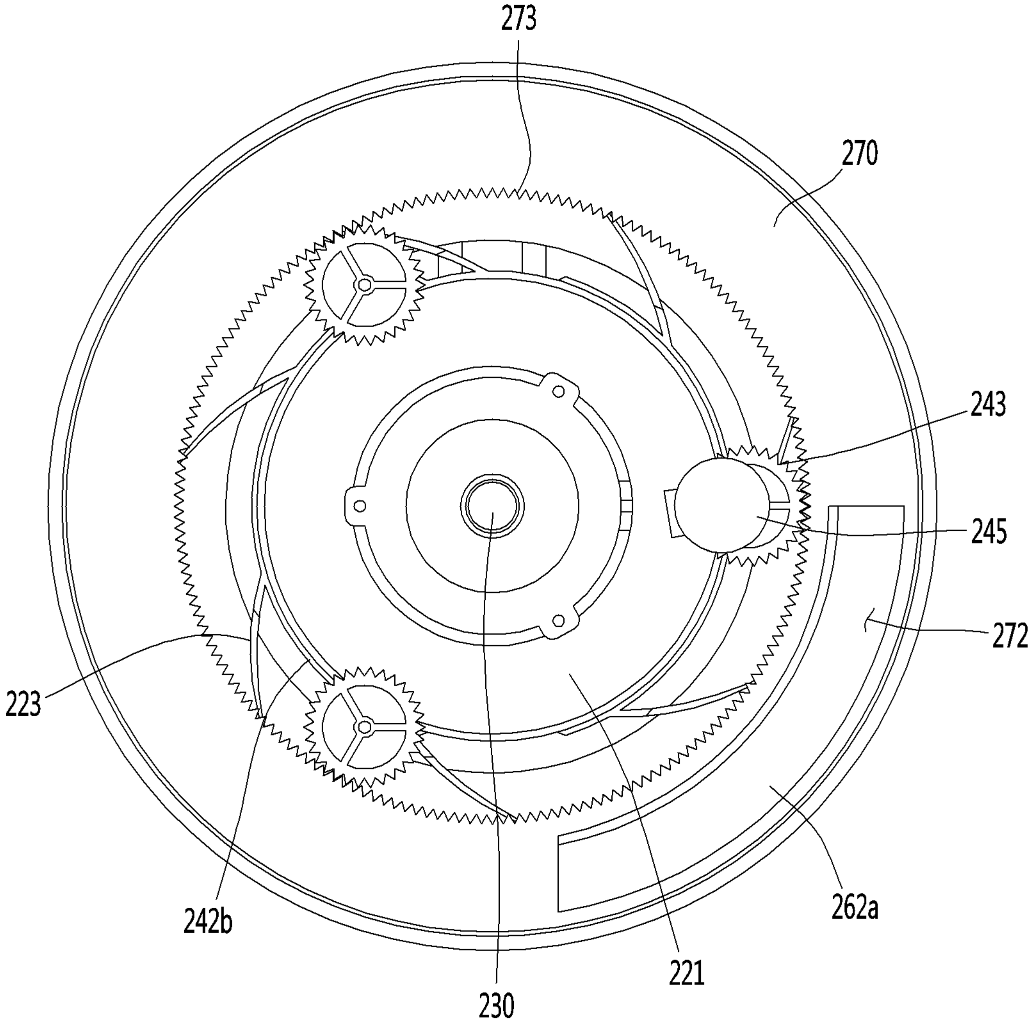
FIG. 18 is a top view showing the coupling state of a second pinion gear and a second rack gear of a second blowing unit according to an embodiment of the present invention.
Figure 19:
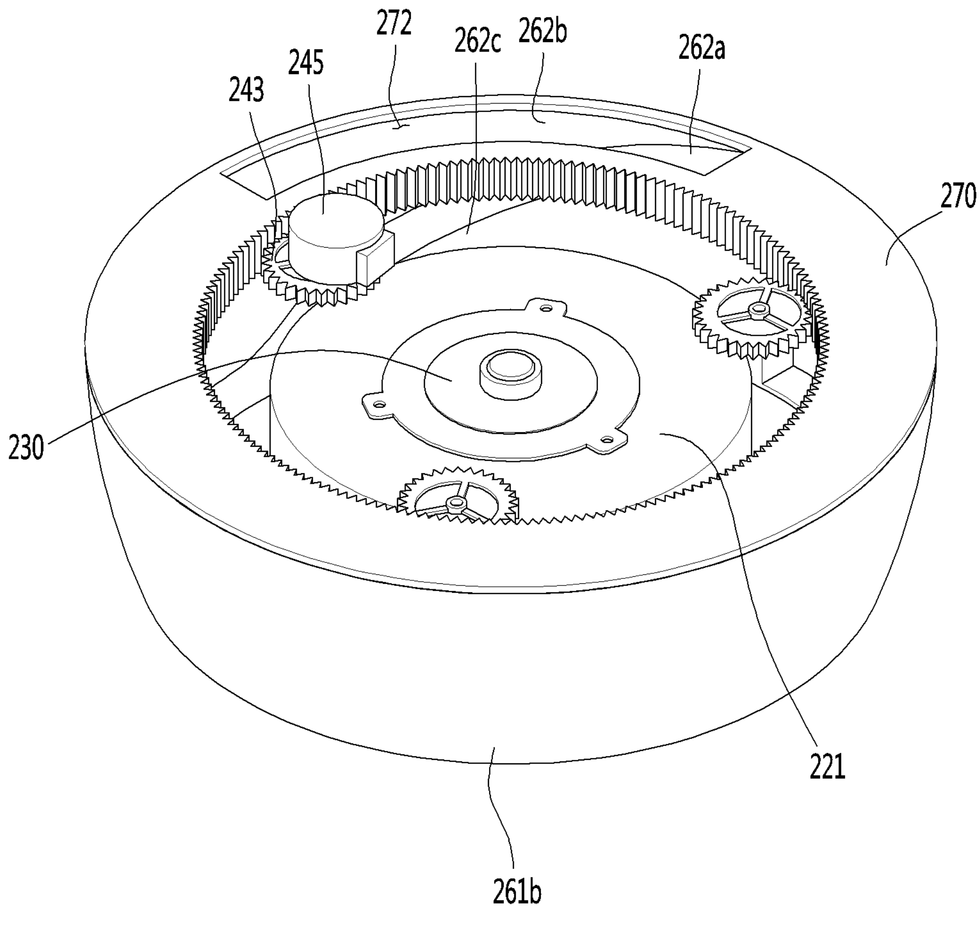
FIG. 19 is a perspective view showing the coupling state of a second pinion gear and a second rack gear of a second blowing unit according to an embodiment of the present invention.

FIG. 18 is a top view showing the coupling state of the second pinion gear and the second rack gear 273 of the second blowing unit according to the embodiment of the present invention, and FIG. 19 is a perspective view showing the coupling state of the second pinion gear and the second rack gear 273 of the second blowing unit according to the embodiment of the present invention.

Referring to FIGS. 18 and 19, some of the plurality of second pinion gears 243 coupled to the second fan housing 240 may be exposed to the outside of the second fan housing 240. In this state, when the second rotation discharging part is disposed, the second rack gear 273 of the second discharging part 270 of the configuration of the second rotation discharging part may be engaged with the second pinion gear 243.

In this state, when the first gear motor 145 coupled to any one of the plurality of second pinion gears 243 is driven to rotate the second pinion gear 243, the second rack gear 273 may be rotated by the second pinion gear 243. By rotation of the second rack gear 273, the second discharging part 270 may be rotated and the second flow guide part 260 coupled to the second discharging part 270 may also be rotated.

That is, the second flow guide part 260 and the second discharging part 270 may be rotated by 360 degrees in the circumferential direction. Therefore, the air introduced through the second suction part 210 may be laterally discharged according to the rotation direction of the second flow guide part 260 and the second discharging part 270.

As described above, in the configuration of the main body 10 of the blowing device according to the embodiment of the present invention, the first rotation discharging part of the first blowing unit 100 and the second rotation discharging part of the second blowing unit 200 may be independently rotated. That is, the rotation operation of the first rotation discharging part of the first blowing unit 100 and the rotation operation of the second rotation discharging part of the second blowing unit 200 may be separately (independently) performed.

Specifically, the first rotation discharging part of the first blowing unit 100 and the second rotation discharging part of the second blowing unit 200 may be rotated such that the first discharging direction in which the first rotation discharging part discharges air and the second discharging direction in which the second rotation discharging unit discharges air become equal.

More specifically, the first rotation discharging unit and the second rotation discharging unit may be rotated such that the first discharging port 172 and the second discharging port 272 are vertically arranged at the same position. Accordingly, the flow direction of air discharged through the first discharging port 172 and then changed to the lateral direction by the first flow changing part 180 and the flow direction of air discharged through the second discharging port and then changed to the lateral direction by the second flow changing part 280 may become equal. In this case, since air discharged by the first blowing unit 100 and air discharged by the second blowing unit 200 are discharged in the same direction, the intensity of discharged air can be strengthened.

In contrast, the first rotation discharging part of the first blowing unit 100 and the second rotation discharging part of the second blowing unit 200 may be rotated such that the first discharging direction in which the first rotation discharging part discharges air and the second discharging direction in which the second rotation discharging part discharges air become different.

More specifically, the first rotation discharging part and the second rotation discharging part may be rotated such that the first discharging port 172 and the second discharging port are vertically disposed at different positions. Accordingly, the flow direction of air discharged through the first discharging port 172 and then changed to the lateral direction by the first flow changing part 180 and the flow direction of air discharged through the second discharging port and then changed to the lateral direction by the second flow changing part 280 may become different. In this case, since the direction of air discharged by the first blowing unit 100 and the direction of air discharged by the second blowing unit 200 are different, air can be simultaneously discharged to a plurality of spaces.

INDUSTRIAL APPLICABILITY

According to the present embodiments, as air is discharged by 360 degrees about the central axis of the blowing device, it is possible to discharge air to a user regardless of the position of the user. Therefore, it is not necessary to move the blowing device. Accordingly, the present invention is industrially applicable.

The invention claimed is:

1. A blowing device comprising:
- a first blowing unit configured to suck air from an upper space thereof and to discharge air in a lower lateral direction; and
- a second blowing unit disposed below the first blowing unit to suck air from a lower space thereof and to discharge air in an upper lateral direction, wherein the first blowing unit includes:
  - a first suction device disposed at an upper portion of the first blowing unit, and having formed therein a first suction opening, through which air is sucked;
  - a first flow generator disposed below the first suction device to generate flow of the sucked air;
  - a first rotation discharging device rotatably connected to the first flow generator to guide air flowing by the first flow generator, the first rotation discharging device being configured to rotate in a circumferential direction to discharge the air downward; and
  - a first flow changing device disposed below the first rotation discharging device to change flow of the air discharged from the first rotation discharging device to the lower lateral direction, wherein a first discharging port is formed at the first rotation discharging device, the first discharging port having a width defined in the circumferential direction to guide discharge of the air, and wherein the first blowing unit and the second blowing unit are rotated about a central axis thereof to adjust a direction of discharged air.

2. The blowing device according to claim 1, wherein the second blowing unit includes:
- a second suction device disposed at a lower portion of the second blowing unit and having formed therein a second suction opening, through which air is sucked;
- a second flow generator disposed above the second suction device to generate flow of the sucked air;
- a second rotation discharging device rotatably coupled to the second flow generator to guide air flowing by the second flow generator, the second rotation discharging device being configured to rotate in a circumferential direction to discharge the air upward; and a second flow changing device disposed above the second rotation discharging device to change flow of the air discharged from the second rotation discharging device to the upper lateral direction, and wherein the first rotation discharging device and the second rotation discharging device are independently rotated.

3. The blowing device according to claim 1, wherein the first blowing unit and the second blowing unit have a same central axis and are vertically symmetrical to each other.

4. The blowing device according to claim 1, wherein the first blowing unit and the second blowing unit are rotatable by 360 degrees about the central axis.

5. The blowing device according to claim 2, further comprising:

a first discharging device provided in the first blowing unit to discharge air; and a second discharging device provided in the second blowing unit to discharge air, wherein the first rotation discharging device and the second rotation discharging device are rotated such that flow directions of air discharged by the first discharging device and air discharged by the second discharging device become the same.

6. The blowing device according to claim 2, further comprising:

a first discharging device provided in the first blowing unit to discharge air; and a second discharging device provided in the second blowing unit to discharge air, wherein the first rotation discharging device and the second rotation discharging device are rotated such that flow directions of air discharged by the first discharging device and air discharged by the second discharging device become different.

7. The blowing device according to claim 1, further comprising a first case connected to a lower end of the first suction device to form an appearance of the first blowing unit, wherein the first rotation discharging device is disposed between the first case and the first flow generator.

8. The blowing device according to claim 7, wherein the first flow generator includes:

a first fan configured to generate air flow by rotation;

a first fan motor configured to provide a drive force to rotate the first fan; and a first fan housing in which the first fan motor and the first fan are received.

9. The blowing device according to claim 8, wherein the first rotation discharging device includes:

a first flow guide disposed between the first case and the first fan housing to provide a first guide flow passage, through which air flowing by the first fan is guided; and a first discharging device disposed below the first flow guide and having formed therein the first discharging port for discharging the air guided by the first flow guide downward, and wherein the first discharging device is rotated.

10. The blowing device according to claim 8, wherein the first discharging device communicates with the first flow guide such that the first guide flow passage and the first discharging port are vertically arranged.

11. The blowing device according to claim 9, further comprising:

one or more first pinion gears provided in the first fan housing;

a first drive motor configured to transmit a drive force to the one or more first pinion gears; and first rack gears provided in the first discharging device and engaged with the one or more first pinion gears, wherein, when the one or more first pinion gears and the first rack gears are interlocked, the first discharging device is rotated.

12. The blowing device according to claim 9, wherein the first rotation discharging device further includes a guide support disposed between the first flow guide and the first fan housing to support the first flow guide.

13. The blowing device according to claim 1, wherein the first flow changing device includes an inclined surface rounded downward from a center portion thereof towards an outside thereof.

14. The blowing device according to claim 1, further comprising a filter disposed in the first suction opening to filter the sucked air.

15. The blowing device according to claim 1, further comprising a heater provided at a lower portion of the second blowing unit.

16. A blowing device, comprising:

a first blowing unit configured to suck air from an upper space thereof and to discharge air in a lower lateral direction;

a second blowing unit disposed below the first blowing unit to suck air from a lower space thereof and to discharge air in an upper lateral direction; and a partitioning device disposed between the first blowing unit and the second blowing unit, wherein the partitioning device includes:

a first flow changing device disposed at a lower portion of the first blowing unit and extending from a center portion downward in an outer radial direction; and a second flow changing device disposed at an upper portion of the second blowing unit and extending from a center portion upward in the outer radial direction, wherein the first blowing unit and the second blowing unit are vertically symmetrical to each other, and wherein the first flow changing device and the second flow changing device are vertically symmetrical to each other.

17. The blowing device according to claim 16, further comprising:

a first fan provided in the first blowing unit; and a second fan provided in the second blowing unit.

18. The blowing device according to claim 17, wherein the first fan or the second fan includes a centrifugal fan.

19. The blowing device according to claim 16, wherein the first blowing unit includes:

a first suction device disposed at an upper portion of the first blowing unit and having formed therein a first suction opening, through which air is sucked;

a first flow generator disposed below the first suction device to generate flow of the sucked air; and a first rotation discharging device rotatably connected to the first flow generator to guide air flowing by the first flow generator, wherein the first rotation discharging device is configured to rotate in a circumferential direction to discharge the air downward and having a first discharging port to discharge the air, and wherein the first flow changing device is disposed below the first rotation discharging device to change flow of the air discharged from the first rotation discharging device to the lower lateral direction.

20. The blowing device according to claim 19, wherein the second blowing unit includes:

a second suction device disposed at a lower portion of the second blowing unit, and having formed therein a second suction opening, through which air is sucked;

a second flow generator disposed above the second suction device to generate flow of the sucked air; and a second rotation discharging device rotatably coupled to the second flow generator to guide air flowing by the second flow generator, wherein the second rotation discharging device is configured to rotate in the circumferential direction to discharge the air upward and having a second discharging port to discharge the air, and wherein the second flow changing device is disposed above the second rotation discharging device to change flow of the air discharged from the second rotation discharging device to the upper lateral direction.

* * * * *